US011831507B2

(12) United States Patent
Guim Bernat et al.

(10) Patent No.: US 11,831,507 B2
(45) Date of Patent: *Nov. 28, 2023

(54) MODULAR I/O CONFIGURATIONS FOR EDGE COMPUTING USING DISAGGREGATED CHIPLETS

(71) Applicant: Intel Corporation, Santa Clara, CA (US)

(72) Inventors: Francesc Guim Bernat, Barcelona (ES); Kshitij Arun Doshi, Tempe, AZ (US); Ned M. Smith, Beaverton, OR (US); Timothy Verrall, Pleasant Hill, CA (US); Uzair Qureshi, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/737,413

(22) Filed: May 5, 2022

(65) Prior Publication Data
US 2022/0337481 A1 Oct. 20, 2022

Related U.S. Application Data

(63) Continuation of application No. 16/723,118, filed on Dec. 20, 2019, now Pat. No. 11,388,054.

(Continued)

(51) Int. Cl.
*H04L 41/084* (2022.01)
*H04L 41/0869* (2022.01)
(Continued)

(52) U.S. Cl.
CPC .......... *H04L 41/0843* (2013.01); *G06F 1/206* (2013.01); *G06F 9/4881* (2013.01);
(Continued)

(58) Field of Classification Search
CPC . G06F 13/4027; G06F 13/4282; H04L 12/64; H04L 12/66; H04L 49/15
See application file for complete search history.

(56) References Cited

U.S. PATENT DOCUMENTS 9,430,437 B1 * 8/2016 Krishnan ............ G06F 13/4027
9,916,636 B2  3/2018 Li et al.
(Continued)

FOREIGN PATENT DOCUMENTS

CN   111865647 A   10/2020
CN   111953725 A   11/2020
(Continued)

OTHER PUBLICATIONS

"European Application Serial No. 20160858.5, Response filed Sep. 20, 2022 to Communication Pursuant to Article 94(3) EPC dated May 23, 2022", 20 pgs.
(Continued)

*Primary Examiner* — Mahran Y Abu Roumi
(74) *Attorney, Agent, or Firm* — Schwegman Lundberg & Woessner, P.A.

(57) ABSTRACT

Various approaches for deployment and use of configurable edge computing platforms are described. In an edge computing system, an edge computing device includes hardware resources that can be composed from a configuration of chiplets, as the chiplets are disaggregated for selective use and deployment (for compute, acceleration, memory, storage, or other resources). In an example, configuration operations are performed to: identify a condition for use of the hardware resource, based on an edge computing workload received at the edge computing device; obtain, determine, or identify properties of a configuration for the hardware resource that are available to be implemented with the chiplets, with the configuration enabling the hardware resource to satisfy the condition for use of the hardware (Continued)

resource; and compose the chiplets into the configuration, according to the properties of the configuration, to enable the use of the hardware resource for the edge computing workload.

31 Claims, 13 Drawing Sheets

Related U.S. Application Data

(60) Provisional application No. 62/939,303, filed on Nov. 22, 2019, provisional application No. 62/907,597, filed on Sep. 28, 2019, provisional application No. 62/841,042, filed on Apr. 30, 2019.

(51) Int. Cl.
| | |
|---|---|
| *H04L 49/00* | (2022.01) |
| *H04L 47/78* | (2022.01) |
| *H04L 41/5054* | (2022.01) |
| *G06F 9/48* | (2006.01) |
| *G06F 9/50* | (2006.01) |
| *G06F 9/54* | (2006.01) |
| *G06F 11/30* | (2006.01) |
| *H04L 9/06* | (2006.01) |
| *H04L 9/32* | (2006.01) |
| *G06F 1/20* | (2006.01) |
| *H04L 67/10* | (2022.01) |
| *H04W 4/08* | (2009.01) |
| *H04W 12/04* | (2021.01) |

(52) U.S. Cl.
CPC ............ *G06F 9/505* (2013.01); *G06F 9/5094* (2013.01); *G06F 9/542* (2013.01); *G06F 11/3006* (2013.01); *H04L 9/0637* (2013.01); *H04L 9/3213* (2013.01); *H04L 9/3247* (2013.01); *H04L 41/0869* (2013.01); *H04L 41/5054* (2013.01); *H04L 47/781* (2013.01); *H04L 49/70* (2013.01); *H04L 67/10* (2013.01); *H04W 4/08* (2013.01); *H04W 12/04* (2013.01); *G06F 2209/5021* (2013.01)

(56) References Cited

U.S. PATENT DOCUMENTS

| | | | |
|---|---|---|---|
| 10,198,294 | B2 | 2/2019 | Chiou et al. |
| 10,277,677 | B2 | 4/2019 | Nachimuthu et al. |
| 10,348,574 | B2 | 7/2019 | Kulkarni et al. |
| 11,087,006 | B2 | 8/2021 | Feroz et al. |
| 11,425,111 | B2 | 8/2022 | Smith et al. |
| 11,757,795 | B2 | 9/2023 | Grunwald et al. |
| 2011/0106916 | A1 | 5/2011 | Cho et al. |
| 2011/0296019 | A1 | 12/2011 | Ferris et al. |
| 2012/0303818 | A1 | 11/2012 | Thibeault et al. |
| 2014/0019658 | A1 | 1/2014 | Ho et al. |
| 2014/0040449 | A1* | 2/2014 | Kinoshita ................ G06F 11/32 709/223 |
| 2014/0136710 | A1 | 5/2014 | Benari et al. |
| 2015/0331776 | A1* | 11/2015 | Krenik ................ G06F 13/4068 710/110 |
| 2017/0353397 | A1 | 12/2017 | Che |
| 2017/0366606 | A1 | 12/2017 | Ben-Shaul et al. |
| 2018/0189081 | A1 | 7/2018 | Upasani et al. |
| 2018/0285009 | A1 | 10/2018 | Guim Bernat et al. |
| 2019/0012211 | A1* | 1/2019 | Selvaraj ................ G06F 9/5072 |
| 2019/0026450 | A1* | 1/2019 | Egner ................... G06F 21/44 |
| 2019/0034363 | A1 | 1/2019 | Palermo et al. |
| 2019/0044703 | A1 | 2/2019 | Smith |
| 2019/0266088 | A1 | 8/2019 | Kumar |
| 2019/0324820 | A1 | 10/2019 | Krishnan et al. |
| 2020/0051961 | A1 | 2/2020 | Rickard et al. |
| 2020/0136906 | A1 | 4/2020 | Guim Bernat et al. |
| 2020/0241921 | A1 | 7/2020 | Calmon et al. |

FOREIGN PATENT DOCUMENTS

| | | |
|---|---|---|
| EP | 3382544 A1 | 10/2018 |
| WO | WO-2020226979 A2 | 11/2020 |
| WO | WO-2020226979 A8 | 11/2020 |

OTHER PUBLICATIONS

"European Application Serial No. 20155735.2, EPO Written Decision to Refuse dated Jan. 20, 2023", 18 pgs.
"Indian Application Serial No. 202047055252, First Examination Report dated Jan. 16, 2023", 6 pgs.
U.S. Appl. No. 16/723,118 U.S. Pat. No. 11,388,054, filed Dec. 20, 2019, Modular I/O Configurations for Edge Computing Using Disaggregated Chiplets.
"U.S. Appl. No. 16/723,118, Advisory Action dated Nov. 16, 2021", 3 pgs.
"U.S. Appl. No. 16/723,118, Examiner Interview Summary dated Nov. 10, 2021", 2 pgs.
"U.S. Appl. No. 16/723,118, Final Office Action dated Sep. 10, 2021", 27 pgs.
"U.S. Appl. No. 16/723,118, Non Final Office Action dated May 27, 2021", 20 pgs.
"U.S. Appl. No. 16/723,118, Notice of Allowance dated Jan. 18, 2022", 20 pgs.
"U.S. Appl. No. 16/723,118, Response filed Aug. 27, 2021 to Non Final Office Action dated May 27, 2021", 13 pgs.
"U.S. Appl. No. 16/723,118, Response filed Nov. 8, 2021 to Final Office Action dated Sep. 10, 2021", 14 pgs.
"U.S. Appl. No. 17/119,785, Preliminary Amendment filed", 7 pgs.
"European Application Serial No. 20155735.2, Communication Pursuant to Article 94(3) EPC dated Feb. 11, 2021", 4 pgs.
"European Application Serial No. 20155735.2, Extended European Search Report dated Jul. 24, 2020", 10 pgs.
"European Application Serial No. 20155735.2, Response filed Jan. 18, 2021 to Extended European Search Report dated Jul. 24, 2020", 13 pgs.
"European Application Serial No. 20155735.2, Response filed Jun. 21, 2021 to Communication Pursuant to Article 94(3) EPC dated Feb. 11, 2021", 18 pgs.
"European Application Serial No. 20155735.2, Summons to attend oral proceedings mailed Feb. 28, 2022", 11 pgs.
"European Application Serial No. 20160858.5, Extended European Search Report dated Sep. 10, 2020", 9 pgs.
"European Application Serial No. 20160858.5, Response filed Mar. 22, 2021 to Extended European Search Report dated Sep. 10, 2020", 27 pgs.
"International Application Serial No. PCT/US2020/030554, International Search Report dated Jan. 15, 2021", 5 pgs.
"International Application Serial No. PCT/US2020/030554, Written Opinion dated Jan. 15, 2021", 6 pgs.
Alexoudi, Theonitsa, et al., "Optics in Computing: From Photonic Network-on-Chip to Chip-to-Chip nterconnects and Disintegrated Architectures", Ournal of Lightwave Technology, vol. 37, No. 2 (Jan. 15, 2019), 17 pgs.
Guangshun, Li, et al., "Method of Resource Estimation Based on QoS in Edge Computing, Published in: Hindawi Wireless Communications and Mobile Computing", (Jan. 22, 2018), 10 pgs.
Hesham, El-Sayed, et al., "Edge of Things: The Big Picture on the Integration of Edge, IoT and the Cloud in a Distributed Computing Environment", (Feb. 14, 2018), 12 pgs.
Liqing, Liu, et al., "Multi-objective optimization for computation offloading in mobile-edge computing", IEEE Symposium on Computers and Communications (ISCC), (Jul. 3, 2017), 832-837.
Mahir, Kaya, "An Optimal Application Partitioning and Computational Offloading Framework for Mobile Cloud Computing", (Jan. 2016), 131 pgs.

(56) References Cited

OTHER PUBLICATIONS

Messous, Mohamed-Ayoub, et al., "Computation offloading game for an UAV network in mobile edge computing", IEEE International Conference on Communications (ICC), IEEE, (May 21, 2017), 1-6.

Sengupta, Dipanjan, et al., "Scheduling Multi-tenant Cloud Workloads on Accelerator-Based Systems", International Conference for High Performance Computing, Networking, Storage and Analysis, IEEE, (Nov. 16, 2014), 513-524.

Tayade, Shreya, et al., "Delay Constrained Energy Optimization for Edge Cloud Offloading", IEEE International Conference on Communications Workshops (ICC Workshops), IEEE, (May 20, 2018), 1-6.

Wang, Jianyu, et al., "Edge Cloud Offloading Algorithms", ACM Computing Surveys, ACM, New York, NY, US, US, vol. 52, No. 1, (Feb. 13, 2019), 1-23.

Zhao, Yangming, et al., "Job Scheduling for Acceleration Systems in Cloud Computing", IEEE International Conference on Communications (ICC), (May 20, 2018), 1-6.

Zhu, Qiliang, et al., "Task offloading decision in fog computing system", China Communications, China Institute of Communications, Piscataway, NJ, USA, vol. 14, No. 11, (Nov. 1, 2017), 59-68.

"European Application Serial No. 20801584.2, Partial Supplementary European Search Report dated May 17, 2023", 14 pgs.

Cheol-Ho, Hong, "qCon: QoS-Aware Network Resource Management for Fog Computing", vol. 18, No. 10,, [Online] Retrieved from the internet:https: pdfs.semanticscholar.org 65d2 7b9576f6e39dda2413ad822a46e33a6055b5,pdf, (Oct. 13, 2018), 21 pgs.

Enas, Ahmad, "Location-Aware, Context-Driven QoS for IoT Applications", IEEE Systems Journal, IEEE, US, vol. 14, No. 1, (Feb. 12, 2019), 12 pgs.

Flathagen, Joakim, "A combined Network Access Control and QoS scheme for Software Defined Networks", IEEE Conference on Network Function Virtualization and Software Defined Networks (NFV-SDN), IEEE, (Nov. 27, 2018), 6 pgs.

Gupta, Harshit, "SDFog: A Software Defined Computing Architecture for QoS Aware Service Orchestration over Edge Devices", arxiv.org, Cornell University Library, 201 Olin Library Cornell University Ithaca, NY 14853, (Sep. 5, 2016), 14 pgs.

Joshua, Boley M, "Adaptive QoS for data transfers using software-defined networking", IEEE International Conference on Advanced Networks and Telecommunications Systems (ANTS), IEEE, (Nov. 6, 2016), 6 pgs.

Slavica, Tomovic, "An Architecture for QoS-aware Service Deployment in Software-Defined IoT Networks", 20th International Symposium on Wireless Personal Multimedia Communications (WPMC), IEEE, (Dec. 17, 2017), 7 pgs.

Yu, Hong, "A Group Key Distribution Scheme for Wireless Sensor Networks in the Internet of Things Scenario", International Journal of Distributed Sensor Networks, (2012), 12 pgs.

"U.S. Appl. No. 17/119,785, Non Final Office Action dated Sep. 29, 2023", 12 pgs.

Sven, Akkermans, "Software Technologies for Multi-Tenant Internet of Things Platforms", Ku Leuven, (Apr. 2019), 222 pgs.

"European Application Serial No. 20801584.2, Extended European Search Report dated Aug. 18, 2023", 12 pgs.

\* cited by examiner

US 11,831,507 B2

MODULAR I/O CONFIGURATIONS FOR EDGE COMPUTING USING DISAGGREGATED CHIPLETS

PRIORITY APPLICATIONS

This application is a continuation of U.S. patent application Ser. No. 16/723,118, filed Dec. 20, 2019, which claims the benefit of priority to U.S. Provisional Application Ser. No. 62/841,042, filed Apr. 30, 2019 and to U.S. Provisional Application Ser. No. 62/907,597, filed Sep. 28, 2019 and to U.S. Provisional Application Ser. No. 62/939,303, filed Nov. 22, 2019, all of which are incorporated herein by reference in their entirety.

TECHNICAL FIELD

Embodiments described herein generally relate to data processing, network communication, and computer architecture implementations, and in particular, to system arrangements involving the deployment of configurable, disaggregated resources in edge computing nodes within edge computing networks.

BACKGROUND

Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

Edge computing use cases in mobile network settings have been developed for integration with multi-access edge computing (MEC) approaches, also known as "mobile edge computing." MEC approaches are designed to allow application developers and content providers to access computing capabilities and an information technology (IT) service environment in dynamic mobile network settings at the edge of the network. Limited standards have been developed by the European Telecommunications Standards Institute (ETSI) industry specification group (ISG) in an attempt to define common interfaces for operation of MEC systems, platforms, hosts, services, and applications.

Edge computing, MEC, and related technologies attempt to provide reduced latency, increased responsiveness, and more available computing power than offered in traditional cloud network services and wide area network connections. However, the integration of mobility and dynamically launched services to some mobile use and device processing use cases has led to limitations and concerns with orchestration, functional coordination, and resource management, especially in complex mobility settings where many participants (devices, hosts, tenants, service providers, operators) are involved. This complexity is increased in settings where services are offered in an "Edge as a Service" (EaaS) system configuration, where scalable edge computing resources are offered and managed in a way that presents the resources to users as a coordinated "service" available to perform workloads, rather than as resources located among a set of distributed and separated nodes.

The deployment of various Edge, EaaS, MEC, and Fog networks, devices, and services have introduced a number of advanced use cases and distributed computing scenarios occurring at and towards the edge of the network. However, these advanced use cases have also introduced a number of corresponding technical challenges relating to security, processing and network resources, service availability and efficiency, among many other issues. One such challenge is in relation to the use and deployment of customized edge platform architectures, such that the appropriate hardware configuration at an appropriate location can perform workload processing. However, as the number of processing architectures and workloads increases within edge computing systems and deployments, the complexity of system management has also expanded.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
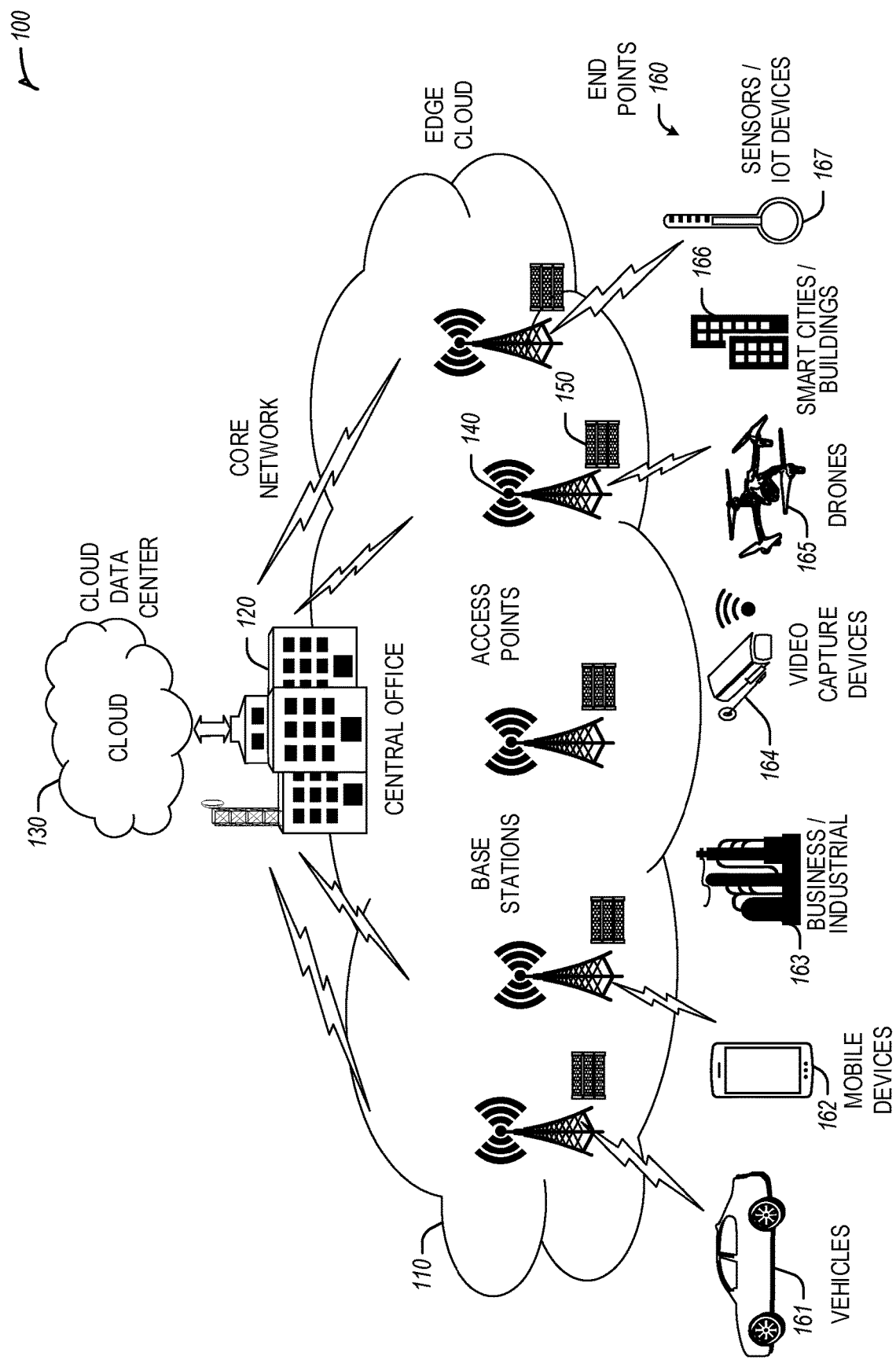
FIG. 1 illustrates an overview of an edge cloud configuration for edge computing, according to an example.

In the following description, methods, configurations, and related apparatuses are disclosed for computing architectures and system deployments via the adaptation and arrangement of various chiplets. The arrangements discussed herein are provided by an edge computing platform or processing circuitry that is composed of different types of chiplets, such as combinations of accelerators, compute resources, and memory resources, which can be registered and managed. This configuration may occur on-the-fly, in some scenarios on the order of nanoseconds or microseconds, and be caused as a result of specific edge workloads or edge computing scenarios.

The following examples provide an introduction of an edge Composed Node Flavor (CNF) where a CNF is a dynamically configured connection of chiplets of a processing circuitry, memory and interconnect capabilities, or platform resources for use in a specific location with a specific set of workloads. The platform architecture establishes the CNF by selecting the proper type and amount of resources required by an edge computing workload. The platform architecture assigns compute elements and creates the right bus connections—using modular I/O components to individual chiplets—to instantiate a "virtual node" that provides specific compute, acceleration or storage capabilities.

The configuration provided by these edge CNFs can evolve over time as the edge cloud ecosystem changes to better accommodate diverse workloads and customer needs. This enables CNFs to be flexibly mapped to multiple types of deployments, workloads and use cases. Further, the underlying edge cloud platform, offered in an EaaS setting or otherwise, may expose different type of Edge CNFs depending on the physical location, type of workloads being mapped and amount of traffic to be driven.

Prior adaptation or configuration of edge and EaaS distributed computing architectures encountered several key management and end-to-end protection challenges, which are addressed by the present technologies. As will be understood from the following examples, the presently described Edge CNF can be scaled up or down depending on throughput requirements; or updated to new definitions as new technologies show up (e.g., by replacing a deep learning model with a new version of the deep learning model); or updated as environmental characteristics change (e.g., as new restrictions on power or system operation are imposed or removed).

Additionally, prior system configurations that attempted to optimize I/O and compute processing within an edge computing system were typically based on one of the following approaches: (1) the result of a static solutions that map data sources at the beginning of a workload or connection, because the mapping rarely changes unless a connection is being reset; (2) the result of intelligence rules residing in a centralized location (such as content or application delivery layers which deploy source mapping based on intelligence running in the cloud); (3) the result of prediction schemes that evaluate characteristics such as UE requirements, movement, and edge infrastructure to implement adaptive bit rates. While these approaches may adapt some types of edge compute scenarios, these prior techniques did not enable re-configuration at low levels of hardware, and often required extensive hardware resources being available on standby that might not even be used.

In an example, management of modular I/O is provided with disaggregated components so that an edge computing platform, circuitry, or CPU composed by multiple small chiplets can be connected dynamically, to dynamically produce a system-on-chip or a cluster of systems-on-chips to specific configurations. Dynamic composition from such chiplets may extend within the CPU itself. Chiplets may include different functionalities and physical characteristics that are tailored to a specialized class of workloads such as content streaming, real-time control, messaging, and social media.

As further detailed in the examples below, chiplets can be discovered by a software stack with the use of discovery interfaces. Discovery of chiplets and resources includes knowing the resources are available, and identifying the metadata that informs what these resources do. Chiplets may even be added dynamically or hot-pluggable (e.g., by the connection of a new discrete device that provides access to N new types of chiplets). These and other configurations may be applied within a variety of hardware configurations in an edge computing architecture. Further overviews of edge computing and workload types are discussed within the following examples.

Example Edge Computing Architectures

FIG. 1 is a block diagram 100 showing an overview of a configuration for edge computing, which includes a layer of processing referenced in many of the current examples as an "edge cloud". This network topology, which may include a number of conventional networking layers (including those not shown herein), may be extended through use of the secure memory management techniques and the compute and network configurations discussed herein.

As shown, the edge cloud 110 is co-located at an edge location, such as the base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer end point devices than at a base station or at a central office). However, the closer that the edge location is to the endpoint (e.g., UEs), the more that space and power is constrained. Thus, edge computing, as a general design principle, attempts to minimize the amount of resources needed for network services, through the distribution of more resources which are located closer both geographically and in network access time.

The following describes aspects of an edge cloud architecture that covers multiple potential deployments and addresses restrictions that some network operators or service providers may have in their own infrastructures (such as having each virtual partition secured with different keys and isolated). These include, variation of configurations based on the edge location (because edges at a base station level, for instance, may have more constrained performance); configurations based on the type of compute, memory, storage, fabric, acceleration, or like resources available to edge locations, tiers of locations, or groups of locations; the service, security, and management and orchestration capabilities; and related objectives to achieve usability and performance of end services.

Edge computing is a developing paradigm where computing is performed at or closer to the "edge" of a network, typically through the use of a compute platform implemented at base stations, gateways, network routers, or other devices which are much closer to end point devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with compute hardware that performs virtualized network functions and offers compute resources for the execution of services and consumer functions for connected devices. These and other scenarios may be enhanced with the use of dynamic chiplet hardware configurations, as provided in the discussion below.

In contrast to the network architecture of FIG. 1, traditional endpoint (e.g., UE, vehicle-to-vehicle (V2V), vehicle-to-everything (V2X), etc.) applications are reliant on local device or remote cloud data storage and processing to exchange and coordinate information. A cloud data arrangement allows for long-term data collection and storage, but is not optimal for highly time varying data, such as a collision, traffic light change, etc. and may fail in attempting to meet latency challenges.

Depending on the real-time requirements in a communications context, a hierarchical structure of data processing and storage nodes may be defined in an edge computing deployment. For example, such a deployment may include local ultra-low-latency processing, regional storage and processing as well as remote cloud data-center based storage and processing. Key performance indicators (KPIs) may be used to identify where sensor data is best transferred and where it is processed or stored. This typically depends on the ISO layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud data-center.

Figure 2:
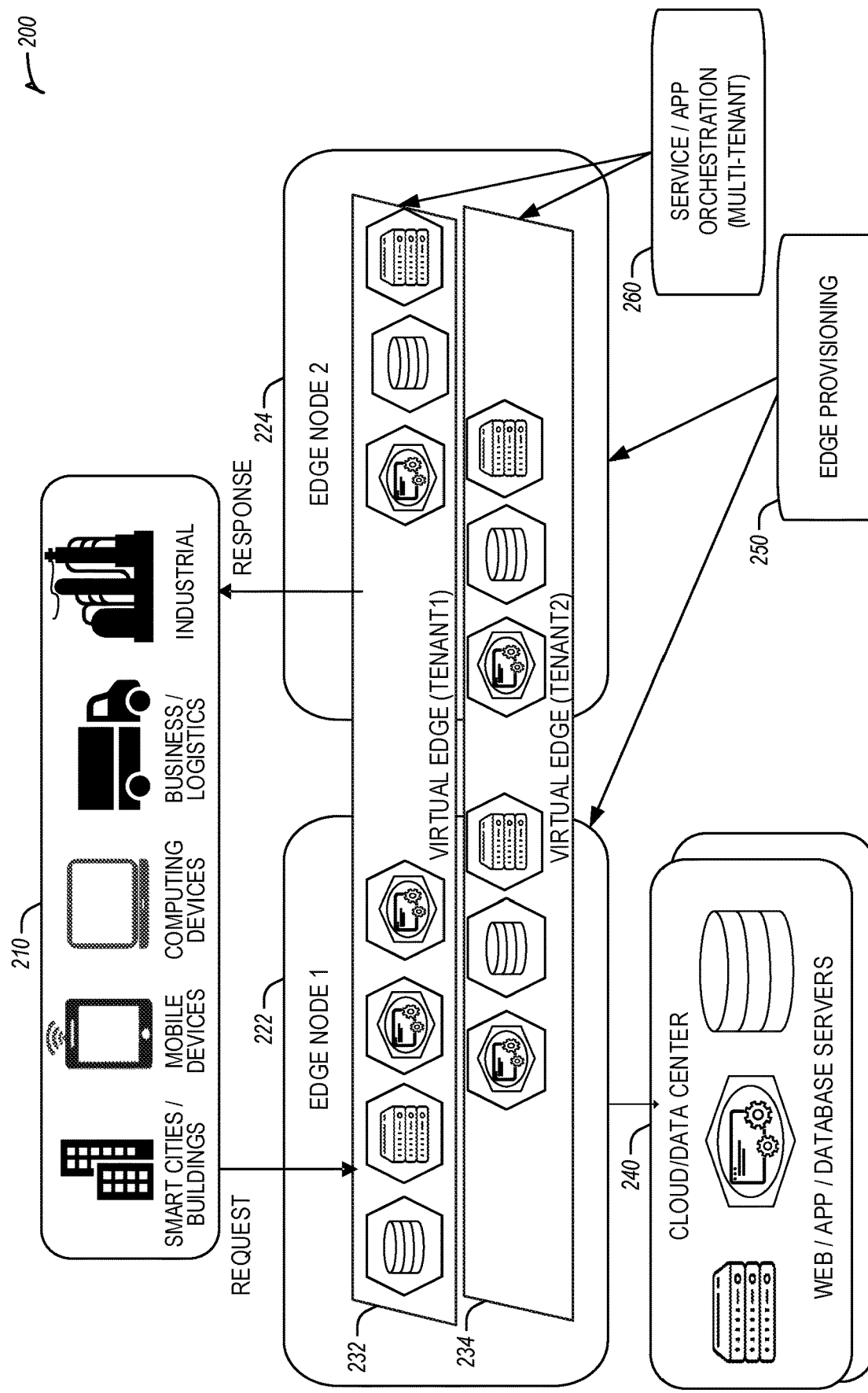
FIG. 2 illustrates deployment and orchestration for virtual edge configurations across an edge computing system operated among multiple edge nodes and multiple tenants, according to an example.

FIG. 2 illustrates deployment and orchestration for virtual edge configurations across an edge computing system operated among multiple edge nodes and multiple tenants. Specifically, FIG. 2 depicts coordination of a first edge node 222 and a second edge node 224 in an edge computing system 200, to fulfill requests and responses for various client endpoints 210 from various virtual edge instances. The virtual edge instances provide edge compute capabilities and processing in an edge cloud, with access to a cloud/data center 240 for higher-latency requests for websites, applications, database servers, etc. Thus, the edge cloud enables coordination of processing among multiple edge nodes for multiple tenants or entities.

In the example of FIG. 2, these virtual edge instances include: a first virtual edge 232, offered to a first tenant (Tenant 1), which offers a first combination of edge storage, computing, and services; and a second virtual edge 234, offering a second combination of edge storage, computing, and services, to a second tenant (Tenant 2). The virtual edge instances 232, 234 are distributed among the edge nodes 222, 224, and may include scenarios in which a request and response are fulfilled from the same or different edge nodes. The configuration of each edge node 222, 224 to operate in a distributed yet coordinated fashion occurs based on edge provisioning functions 250. The functionality of the edge nodes 222, 224 to provide coordinated operation for applications and services, among multiple tenants, occurs based on orchestration functions 260.

It should be understood that some of the devices in 210 are multi-tenant devices where Tenant1 may function within a Tenant1 'slice' while a Tenant2 may function within a Tenant2 slice. A trusted multi-tenant device may further contain a tenant specific cryptographic key such that the combination of key and slice may be considered a "root of trust" (RoT) or tenant-specific RoT. A RoT may further be computed dynamically composed using a security architecture, such as a DICE (Device Identity Composition Engine) architecture where a DICE hardware building block is used to construct layered trusted computing base contexts for layering of device capabilities (such as a Field Programmable Gate Array (FPGA)). The RoT also may be used for a trusted computing context to support respective tenant operations, etc.

Edge computing nodes may partition resources (memory, CPU, GPU, interrupt controller, I/O controller, memory controller, bus controller, etc.) where each partition may contain a RoT capability and where fan-out and layering according to a DICE model may further be applied to edge nodes. Cloud computing nodes consisting of containers, FaaS (function as a service) or EaaS (edge as a service) engines, servlets, servers, or other computation abstraction may be partitioned according to a DICE layering and fan-out structure to support a RoT context for each. Accordingly, the respective RoTs spanning entities 210, 222, and 240 may coordinate the establishment of a distributed trusted computing base (DTCB) such that a tenant-specific virtual trusted secure channel linking all elements end-to-end can be established.

Additionally, the edge computing system may be extended to provide orchestration of multiple applications through the use of containers (a contained, deployable unit of software that provides code and needed dependencies), in a multi-owner, multi-tenant environment. A multi-tenant orchestrator may be used to perform key management, trust anchor management, and other security functions related to the provisioning and lifecycle of the trusted 'slice' concept in FIG. 2. An orchestrator may use a DICE layering and fan-out construction to create a RoT context that is tenant-specific. Thus, orchestration functions, provided by an orchestrator, may participate as a tenant-specific orchestration provider.

Accordingly, an edge computing system may be configured to fulfill requests and responses for various client endpoints from multiple virtual edge instances (and, from a cloud or remote data center, not shown). The use of these virtual edge instances supports multiple tenants and multiple applications (e.g., AR/VR, enterprise applications, content delivery, gaming, compute offload) simultaneously. Further, there may be multiple types of applications within the virtual edge instances (e.g., normal applications, latency sensitive applications, latency critical applications, user plane applications, networking applications, etc.). The virtual edge instances may also be spanned across systems of multiple owners at different geographic locations.

In further examples, edge computing systems may deploy containers in an edge computing system. As a simplified example, a container manager is adapted to launch containerized pods, functions, and functions-as-a-service instances through execution via compute nodes, or to separately execute containerized virtualized network functions through execution via compute nodes. This arrangement may be adapted for use by multiple tenants in system arrangement, where containerized pods, functions, and functions-as-a-service instances are launched within virtual machines specific to each tenant (aside the execution of virtualized network functions).

Within the edge cloud, a first edge node 222 (e.g., operated by a first owner) and a second edge node 224 (e.g., operated by a second owner) may operate or respond to a container orchestrator to coordinate the execution of various applications within the virtual edge instances offered for respective tenants. For instance, the edge nodes 222, 224 may be coordinated based on edge provisioning functions 250, while the operation of the various applications are coordinated with orchestration functions 260.

Various system arrangements may provide an architecture that treats VMs, Containers, and Functions equally in terms of application composition (and resulting applications are combinations of these three ingredients). Each ingredient may involve use of one or more accelerator (e.g., FPGA, ASIC) components as a local backend. In this manner, applications can be split across multiple edge owners, coordinated by an orchestrator.

Figure 3:
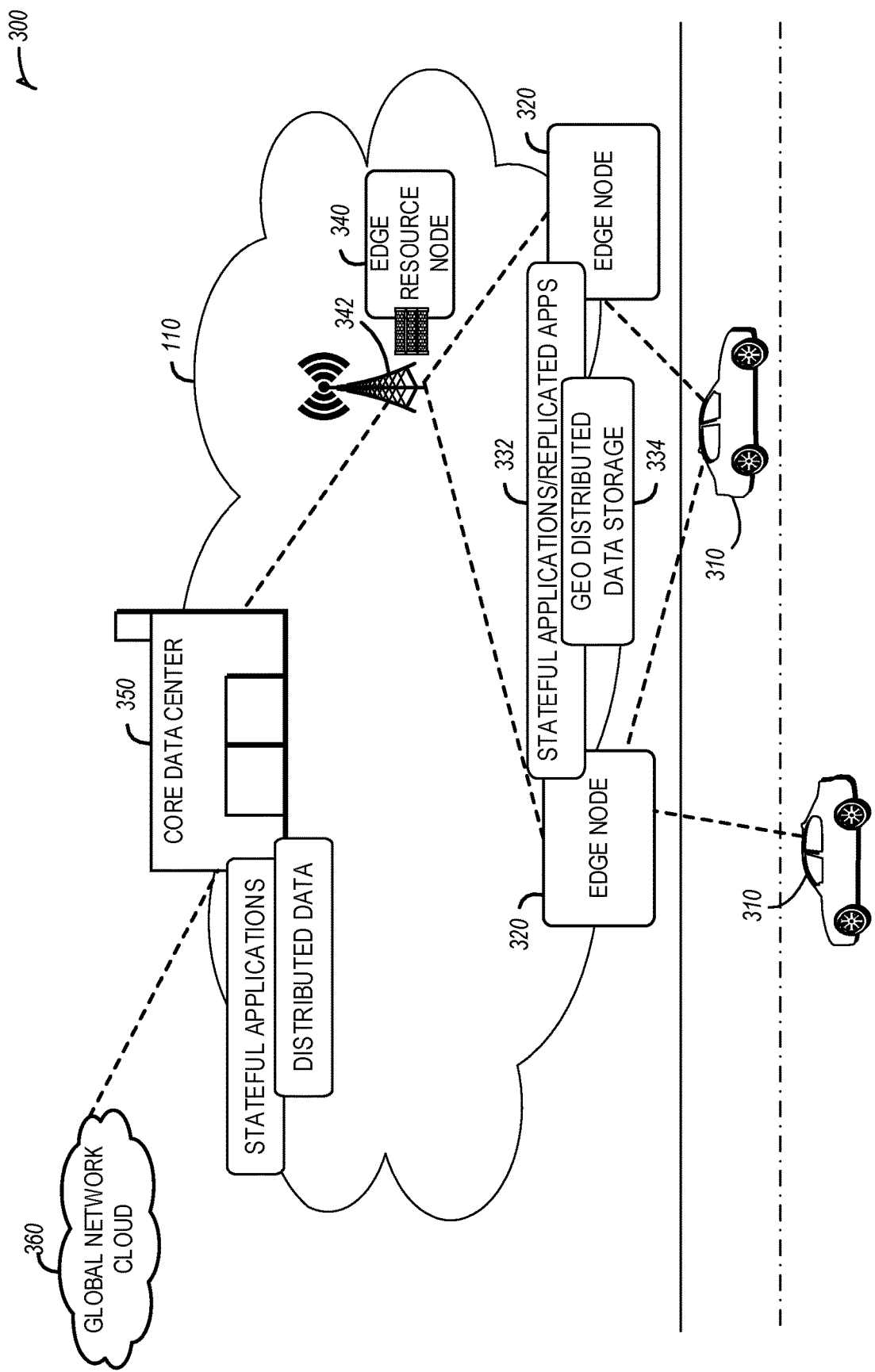
FIG. 3 illustrates a vehicle compute and communication use case involving mobile access to applications in an edge computing system, according to an example.

It should be appreciated that the edge computing systems and arrangements discussed herein may be applicable in various solutions, services, and/or use cases. As an example, FIG. 3 shows a simplified vehicle compute and communication use case involving mobile access to applications in an edge computing system 300 that implements an edge cloud 110. In this use case, each client compute node 310 may be embodied as in-vehicle compute systems (e.g., in-vehicle navigation and/or infotainment systems) located in corresponding vehicles that communicate with the edge gateway nodes 320 during traversal of a roadway. For instance, edge gateway nodes 320 may be located in roadside cabinets, which may be placed along the roadway, at intersections of the roadway, or other locations near the roadway. As each vehicle traverses along the roadway, the connection between its client compute node 310 and a particular edge gateway node 320 may propagate so as to maintain a consistent connection and context for the client compute node 310. Each of the edge gateway nodes 320 includes some processing and storage capabilities and, as such, some processing and/or storage of data for the client compute nodes 310 may be performed on one or more of the edge gateway nodes 320.

Each of the edge gateway nodes 320 may communicate with one or more edge resource nodes 340, which are illustratively embodied as compute servers, appliances or components located at or in a communication base station 342 (e.g., a base station of a cellular network). As discussed above, each edge resource node 340 includes some processing and storage capabilities and, as such, some processing and/or storage of data for the client compute nodes 310 may be performed on the edge resource node 340. For example, the processing of data that is less urgent or important may be performed by the edge resource node 340, while the processing of data that is of a higher urgency or importance may be performed by edge gateway devices or the client nodes themselves (depending on, for example, the capabilities of each component). Further, various wired or wireless communication links (e.g., fiber optic wired backhaul, 5G wireless links) may exist among the edge nodes 320, edge resource node(s) 340, core data center 350, and network cloud 360.

The edge resource node(s) 340 also communicate with the core data center 350, which may include compute servers, appliances, and/or other components located in a central location (e.g., a central office of a cellular communication network). The core data center 350 may provide a gateway to the global network cloud 360 (e.g., the Internet) for the edge cloud 110 operations formed by the edge resource node(s) 340 and the edge gateway nodes 320. Additionally, in some examples, the core data center 350 may include an amount of processing and storage capabilities and, as such, some processing and/or storage of data for the client compute devices may be performed on the core data center 350 (e.g., processing of low urgency or importance, or high complexity). The edge gateway nodes 320 or the edge resource nodes 340 may offer the use of stateful applications 332 and a geographic distributed data storage 334 (e.g., database, data store, etc.).

In further examples, FIG. 3 may utilize various types of mobile edge nodes, such as an edge node hosted in a vehicle (e.g., car, truck, tram, train, etc.) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in a variety of settings, including coordination between some functions or operations at individual endpoint devices or the edge gateway nodes 320, some others at the edge resource node 340, and others in the core data center 350 or global network cloud 360.

In further configurations, the edge computing system may implement FaaS or EaaS computing capabilities through the use of respective executable applications and functions. In an example, a developer writes function code (e.g., "computer code" herein) representing one or more computer functions, and the function code is uploaded to a FaaS or EaaS platform provided by, for example, an edge node or data center. A trigger such as, for example, a service use case or an edge processing event, initiates the execution of the function code with the FaaS or EaaS platform.

In an example of FaaS or EaaS implementations, a container is used to provide an environment in which function code is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, the container is "spun down" (e.g., deactivated and/or deallocated) on the infrastructure in response to the execution being completed.

Further aspects of FaaS or EaaS may enable deployment of edge functions in a service fashion, including a support of respective functions that support edge computing as a service. Additional features of FaaS or EaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require deployment or configuration).

Some of the techniques and configurations discussed with reference to edge computing may be implemented within a MEC environment, such as the provided by the standards and approaches published in ETSI GS MEC-003 "Mobile Edge Computing (MEC); Framework and Reference Architecture" (e.g., V2.0.3) and related MEC or networked operational implementations. While the presently discussed forms of dynamic chiplet hardware configurations techniques and configurations may provide significant benefits to MEC architectures and system deployments, the applicability of the present techniques and configurations may be extended to any number of edge computing, IoT, fog, or distributed computing platforms.

MEC is intended to support developing mobile use cases of edge computing, to allow application developers and content providers to access computing capabilities and an IT service environment in dynamic settings at the edge of the network. MEC offers application developers and content providers cloud-computing capabilities and an IT service environment using equipment located closer to network (e.g., cellular network) edges. This environment is characterized by ultra-low latency and high bandwidth as well as real-time access to radio network information that may be leveraged by applications. MEC technology permits operators to flexibly and rapidly deploy innovative applications and services towards mobile subscribers, enterprises and vertical segments.

MEC, like other edge computing deployments, may reduce network congestion by operating applications, data functions, and discovery, etc. closer to the user (e.g., mobile device, user equipment (UE), station (STA), etc.). Some MEC details dealing with security (e.g., both user security as well as application integrity), radio use, etc., have been promulgated by European Telecommunications Standards Institute (ETSI), such as described in the "Mobile Edge Computing Introductory Technical White Paper," published Sep. 1, 2014. A set of specifications and white papers providing further details and implementation use cases for MEC scenarios is being developed and published on an ongoing basis by ETSI as part of the ETSI MEC industry specification group (ISG).

MEC architectures offers application developers and content providers cloud-computing capabilities and an IT service environment at the edge of the network. This environment is characterized by ultra-low latency and high bandwidth as well as real-time access to radio network information that can be leveraged by applications. MEC technology thus permits flexible and rapid deployment of innovative applications and services towards mobile subscribers, enterprises and vertical segments. For instance, in automotive settings, applications such as V2X (vehicle-to-everything, IEEE 802.11p based or 3GPP LTE-V2X based) may use MEC technology to exchange data, provide data to aggregation points, and access data in databases to provide and obtain an overview of the local situation derived from a multitude of sensors (by various cars, roadside units, etc.).

Figure 4:
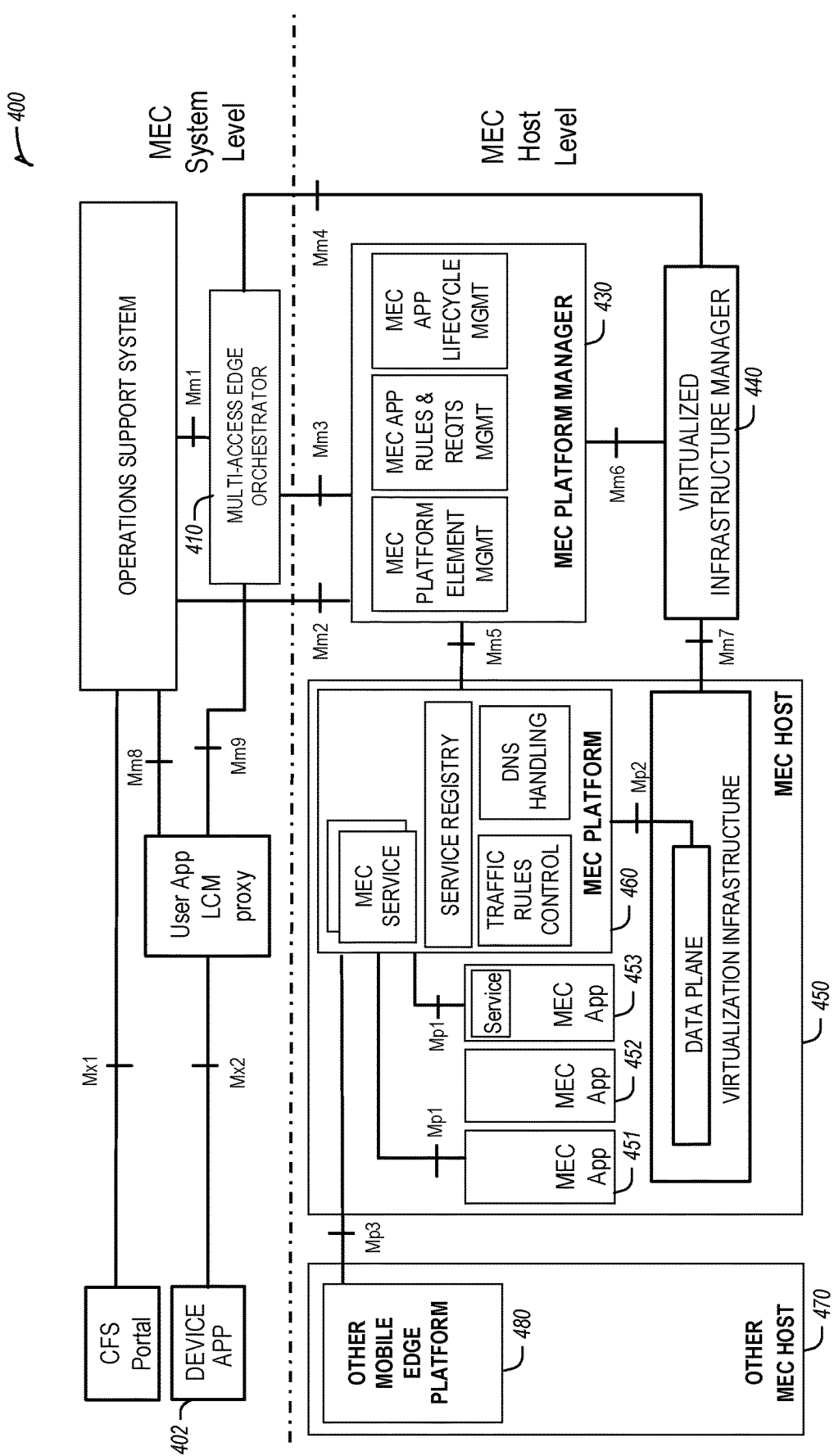
FIG. 4 illustrates a block diagram for a Multi-access Edge Computing (MEC) system architecture, according to an example.

FIG. 4 depicts a block diagram 400 for an example Multi-access Edge Computing (MEC) system architecture. In an example, the MEC system architecture may be defined according to a specification, standard, or other definition (e.g., according to the ETSI ISG MEC-003 specification). In this diagram, Mp reference points refer to MEC platform functionality; Mm reference points refer to management; and Mx refers to connections to external entities. The services, applications, orchestrators, and other entities discussed herein may be implemented at any number of the entities of the MEC system architecture depicted in FIG. 4, and the communications to perform network operations may be implemented at any number of the interfaces of the MEC system architecture depicted in FIG. 4. However, it will also be understood that the particular chiplet configuration and uses discussed herein may be provided in any number of edge stack implementations, including those not involving MEC devices or MEC system arrangements.

For instance, a device application 402 operating at a client user equipment device (e.g., smartphone) may access a multi-access edge orchestrator 410, as the orchestrator 410 coordinates system configuration or features of an edge computing host (including the use of dynamic chiplet hardware configurations) for fulfillment of services or applications. Further, a particular MEC Host 450 may operate one or more MEC applications 451, 452, 453 or a platform 460 which provide a MEC resource or service via a virtual edge appliance, as further detailed in FIGS. 7 and 9. A virtualized infrastructure manager 440 and MEC Platform Manager 430 provide management of the use of the hosts, platforms, and resources, and may also provide managed access to an attestation service or verifier (not shown). The virtualized infrastructure manager 440 and MEC Platform Manager 430 may also provide managed access to other MEC hosts (e.g., host 470) or MEC platforms (e.g., platform 480), which may also be involved with uses of attestation functionality as described herein.

Example Computing Devices

Figure 5:
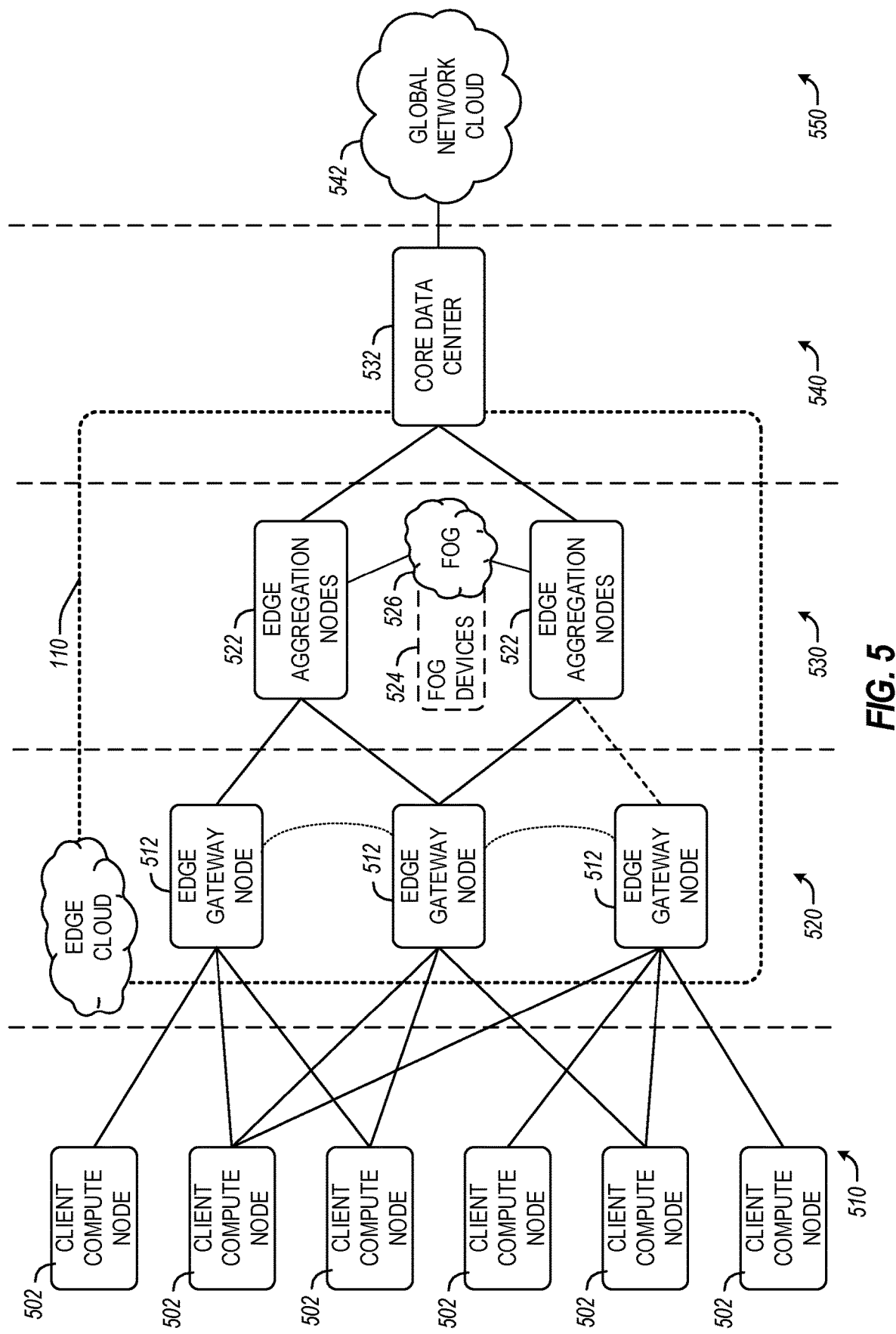
FIG. 5 illustrates an overview of layers of distributed compute deployed among an edge computing environment, according to an example.

At a more generic level, an edge computing system may be described to encompass any number of deployments operating in the edge cloud 110, which provide coordination from client and distributed computing devices. FIG. 5 provides a further abstracted overview of layers of distributed compute deployed among an edge computing environment for purposes of illustration.

FIG. 5 generically depicts an edge computing system for providing edge services and applications to multi-stakeholder entities, as distributed among one or more client compute nodes 502, one or more edge gateway nodes 512, one or more edge aggregation nodes 522, one or more core data centers 532, and a global network cloud 542, as distributed across layers of the network. The implementation of the edge computing system may be provided at or on behalf of a telecommunication service provider ("telco", or "TSP"), internet-of-things service provider, cloud service provider (CSP), enterprise entity, or any other number of entities. Various forms of wired or wireless connections may be configured to establish connectivity among the nodes 502, 512, 522, 532, including interconnections among such nodes (e.g., connections among edge gateway nodes 512, and connections among edge aggregation nodes 522).

Each node or device of the edge computing system is located at a particular layer corresponding to layers 510, 520, 530, 540, 550. For example, the client compute nodes 502 are each located at an endpoint layer 510, while each of the edge gateway nodes 512 are located at an edge devices layer 520 (local level) of the edge computing system.

Additionally, each of the edge aggregation nodes 522 (and/or fog devices 524, if arranged or operated with or among a fog networking configuration 526) are located at a network access layer 530 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein are applicable to fog networks, fogging, and fog configurations. Further, aspects of the edge computing systems discussed herein may be configured as a fog, or aspects of a fog may be integrated into an edge computing architecture.

The core data center 532 is located at a core network layer 540 (e.g., a regional or geographically-central level), while the global network cloud 542 is located at a cloud data center layer 550 (e.g., a national or global layer). The use of "core" is provided as a term for a centralized network location—deeper in the network—which is accessible by multiple edge nodes or components; however, a "core" does not necessarily designate the "center" or the deepest location of the network. Accordingly, the core data center 532 may be located within, at, or near the edge cloud 110.

Although an illustrative number of client compute nodes 502, edge gateway nodes 512, edge aggregation nodes 522, core data centers 532, global network clouds 542 are shown in FIG. 5, it should be appreciated that the edge computing system may include more or fewer devices or systems at each layer. Additionally, as shown in FIG. 5, the number of components of each layer 510, 520, 530, 540, 550 generally increases at each lower level (i.e., when moving closer to endpoints). As such, one edge gateway node 512 may service multiple client compute nodes 502, and one edge aggregation node 522 may service multiple edge gateway nodes 512.

Consistent with the examples provided herein, each client compute node 502 may be embodied as any type of end point component, device, appliance, or "thing" capable of communicating as a producer or consumer of data. Further, the label "node" or "device" as used in the edge computing system 500 does not necessarily mean that such node or device operates in a client or slave role; rather, any of the nodes or devices in the edge computing system 500 refer to individual entities, nodes, or subsystems which include discrete or connected hardware or software configurations to facilitate or use the edge cloud 110.

As such, the edge cloud 110 is formed from network components and functional features operated by and within the edge gateway nodes 512 and the edge aggregation nodes 522 of layers 520, 530, respectively. The edge cloud 110 may be embodied as any type of network that provides edge computing and/or storage resources which are proximately located to radio access network (RAN) capable endpoint devices (e.g., mobile computing devices, IoT devices, smart devices, etc.), which are shown in FIG. 5 as the client compute nodes 502. In other words, the edge cloud 110 may be envisioned as an "edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 110 may form a portion of or otherwise provide an ingress point into or across a fog networking configuration 526 (e.g., a network of fog devices 524, not shown in detail), which may be embodied as a system-level horizontal and distributed architecture that distributes resources and services to perform a specific function. For instance, a coordinated and distributed network of fog devices 524 may perform computing, storage, control, or networking aspects in the context of an IoT system arrangement. Other networked, aggregated, and distributed functions may exist in the edge cloud 110 between the cloud data center layer 550 and the client endpoints (e.g., client compute nodes 502). Some of these are discussed in the following sections in the context of network functions or service virtualization, including the use of virtual edges and virtual services which are orchestrated for multiple stakeholders.

The edge gateway nodes 512 and the edge aggregation nodes 522 cooperate to provide various edge services and security to the client compute nodes 502. Furthermore, because each client compute node 502 may be stationary or mobile, each edge gateway node 512 may cooperate with other edge gateway devices to propagate presently provided edge services and security as the corresponding client compute node 502 moves about a region. To do so, each of the edge gateway nodes 512 and/or edge aggregation nodes 522 may support multiple tenancy and multiple stakeholder configurations, in which services from (or hosted for) multiple service providers and multiple consumers may be supported and coordinated across a single or multiple compute devices.

In various examples, the use of dynamic chiplet hardware configurations may be implemented among the client compute nodes 502, at the edge gateway nodes 512 or aggregation nodes 522, and other intermediate nodes in the edge cloud 110, which operate or utilize service, acceleration, compute, storage, or memory functions, as further discussed below with reference to FIGS. 7 to 12.

In further examples, any of the compute nodes or devices discussed with reference to the present edge computing systems and environment may be fulfilled based on the components depicted in FIGS. 6A and 6B. Each edge compute node may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

Figure 6A:
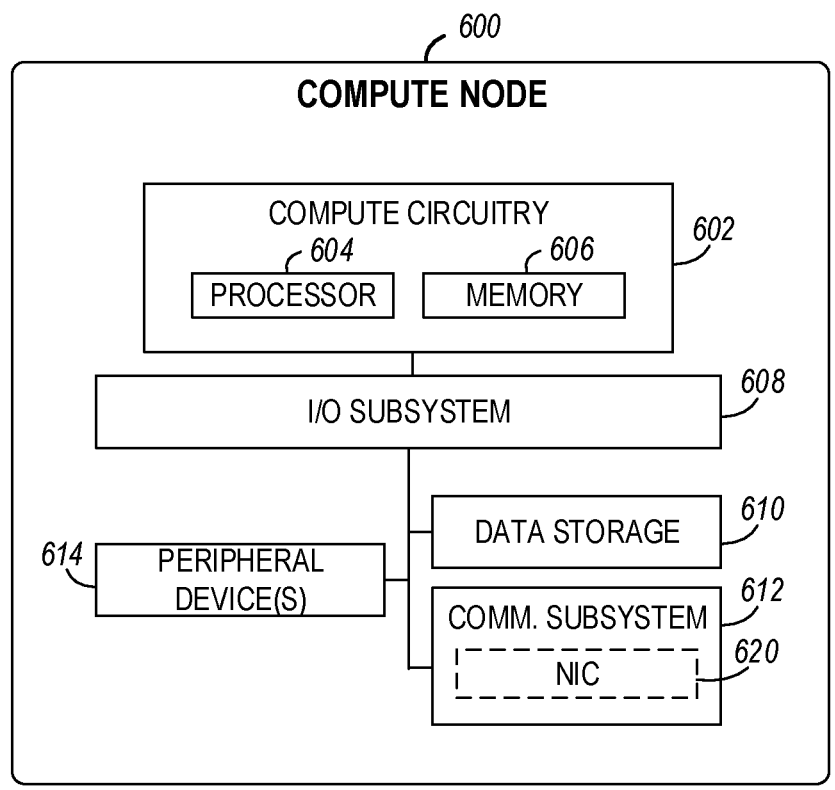
FIG. 6A illustrates an overview of example components deployed at a compute node system, according to an example.

In the simplified example depicted in FIG. 6A, an edge compute node 600 includes a compute engine (also referred to herein as "compute circuitry") 602, an input/output (I/O) subsystem 608, data storage 610, a communication circuitry subsystem 612, and, optionally, one or more peripheral devices 614. In other examples, each compute device may include other or additional components, such as those used in personal or server computing systems (e.g., a display, peripheral devices, etc.). Additionally, in some examples, one or more of the illustrative components may be incorporated in, or otherwise form a portion of, another component.

The compute node 600 may be embodied as any type of engine, device, or collection of devices capable of performing various compute functions. In some examples, the compute node 600 may be embodied as a single device such as an integrated circuit, an embedded system, a field-programmable gate array (FPGA), a system-on-a-chip (SOC), or other integrated system or device. In the illustrative example, the compute node 600 includes or is embodied as a processor 604 and a memory 606. The processor 604 may be embodied as any type of processor capable of performing the functions described herein (e.g., executing an application). For example, the processor 604 may be embodied as a multi-core processor(s), a microcontroller, or other processor or processing/controlling circuit. In some examples, the processor 604 may be embodied as, include, or be coupled to an FPGA, an application specific integrated circuit (ASIC), reconfigurable hardware or hardware circuitry, or other specialized hardware to facilitate performance of the functions described herein.

The main memory 606 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three-dimensional crosspoint memory device (e.g., Intel 3D XPoint™ memory), or other byte addressable write-in-place nonvolatile memory devices. The memory device may refer to the die itself and/or to a packaged memory product. In some examples, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the main memory 606 may be integrated into the processor 604. The main memory 606 may store various software and data used during operation such as one or more applications, data operated on by the application(s), libraries, and drivers.

The compute circuitry 602 is communicatively coupled to other components of the compute node 600 via the I/O subsystem 608, which may be embodied as circuitry and/or components to facilitate input/output operations with the compute circuitry 602 (e.g., with the processor 604 and/or the main memory 606) and other components of the compute circuitry 602. For example, the I/O subsystem 608 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 608 may form a portion of a system-on-a-chip (SoC) and be incorporated, along with one or more of the processor 604, the main memory 606, and other components of the compute circuitry 602, into the compute circuitry 602.

The one or more illustrative data storage devices 610 may be embodied as any type of devices configured for short-term or long-term storage of data such as, for example, memory devices and circuits, memory cards, hard disk drives, solid-state drives, or other data storage devices. Each data storage device 610 may include a system partition that stores data and firmware code for the data storage device 610. Each data storage device 610 may also include one or more operating system partitions that store data files and executables for operating systems depending on, for example, the type of compute node 600.

The communication circuitry 612 may be embodied as any communication circuit, device, or collection thereof, capable of enabling communications over a network between the compute circuitry 602 and another compute device (e.g., an edge gateway node 512 of the edge computing system 500). The communication circuitry 612 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, etc.) to effect such communication.

The illustrative communication circuitry 612 includes a network interface controller (NIC) 620, which may also be referred to as a host fabric interface (HFI). The NIC 620 may be embodied as one or more add-in-boards, daughter cards, network interface cards, controller chips, chipsets, or other devices that may be used by the compute node 600 to connect with another compute device (e.g., an edge gateway node 512). In some examples, the NIC 620 may be embodied as part of a system-on-a-chip (SoC) that includes one or more processors, or included on a multichip package that also contains one or more processors. In some examples, the NIC 620 may include a local processor (not shown) and/or a local memory (not shown) that are both local to the NIC 620. In such examples, the local processor of the NIC 620 may be capable of performing one or more of the functions of the compute circuitry 602 described herein. Additionally or alternatively, in such examples, the local memory of the NIC 620 may be integrated into one or more components of the client compute node at the board level, socket level, chip level, and/or other levels.

Additionally, in some examples, each compute node 600 may include one or more peripheral devices 614. Such peripheral devices 614 may include any type of peripheral device found in a compute device or server such as audio input devices, a display, other input/output devices, interface devices, and/or other peripheral devices, depending on the particular type of the compute node 600. In further examples, the compute node 600 may be embodied by a respective edge compute node in an edge computing system (e.g., client compute node 502, edge gateway node 512, edge aggregation node 522) or like forms of appliances, computers, subsystems, circuitry, or other components.

Figure 6B:
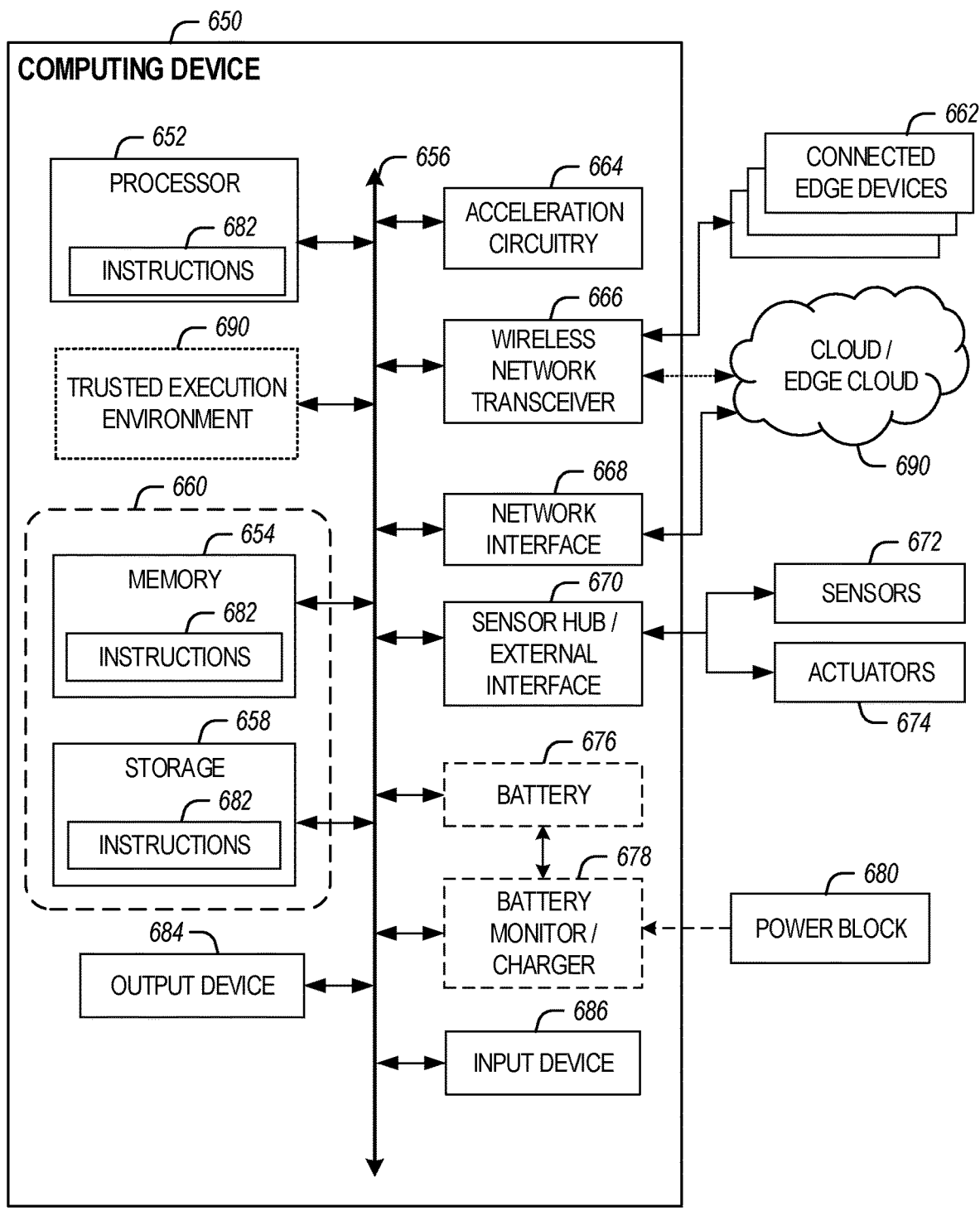
FIG. 6B illustrates a further overview of example components within a computing device, according to an example.

In a more detailed example, FIG. 6B illustrates a block diagram of an example of components that may be present in an edge computing node 650 for implementing the techniques (e.g., operations, processes, methods, and methodologies) described herein. The edge computing node 650 may include any combinations of the components referenced above, and it may include any device usable with an edge communication network or a combination of such networks. The components may be implemented as ICs, portions thereof, discrete electronic devices, or other modules, logic, hardware, software, firmware, or a combination thereof adapted in the edge computing node 650, or as components otherwise incorporated within a chassis of a larger system.

The edge computing node 650 may include processing circuitry in the form of a processor 652, which may be a microprocessor, a multi-core processor, a multithreaded processor, an ultra-low voltage processor, an embedded processor, or other known processing elements. The processor 652 may be a part of a system on a chip (SoC) in which the processor 652 and other components are formed into a single integrated circuit, or a single package, such as the Edison™ or Galileo™ SoC boards from Intel Corporation, Santa Clara, Calif. As an example, the processor 652 may include an Intel® Architecture Core™ based processor, such as a Quark™, an Atom™, an i3, an i5, an i7, an i9, or an MCU-class processor, or another such processor available from Intel®. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or a customer thereof, or their licensees or adopters. The processors may include units such as an A5-A12 processor from Apple® Inc., a Snapdragon™ processor from Qualcomm® Technologies, Inc., or an OMAP™ processor from Texas Instruments, Inc.

The processor 652 may communicate with a system memory 654 over an interconnect 656 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 658 may also couple to the processor 652 via the interconnect 656. In an example, the storage 658 may be implemented via a solid-state disk drive (SSDD). Other devices that may be used for the storage 658 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magneto-resistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 658 may be on-die memory or registers associated with the processor 652. However, in some examples, the storage 658 may be implemented using a micro hard disk drive (HDD). Further, any number of new technologies may be used for the storage 658 in addition to, or instead of, the technologies described, such resistance change memories, phase change memories, holographic memories, or chemical memories, among others.

The components may communicate over the interconnect 656. The interconnect 656 may include any number of technologies, including industry standard architecture (ISA), extended ISA (EISA), peripheral component interconnect (PCI), peripheral component interconnect extended (PCIx), PCI express (PCIe), or any number of other technologies. The interconnect 656 may be a proprietary bus, for example, used in an SoC based system. Other bus systems may be included, such as an I2C interface, an SPI interface, point to point interfaces, and a power bus, among others.

The interconnect 656 may couple the processor 652 to a transceiver 666, for communications with the connected edge devices 662. The transceiver 666 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 662. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 666 (or multiple transceivers) may communicate using multiple standards or radios for communications at a different range. For example, the edge computing node 650 may communicate with close devices, e.g., within about 10 meters, using a local transceiver based on BLE, or another low power radio, to save power. More distant connected edge devices 662, e.g., within about 50 meters, may be reached over ZigBee or other intermediate power radios. Both communications techniques may take place over a single radio at different power levels or may take place over separate transceivers, for example, a local transceiver using BLE and a separate mesh transceiver using ZigBee.

A wireless network transceiver 666 (e.g., a radio transceiver) may be included to communicate with devices or services in the edge cloud 690 via local or wide area network protocols. The wireless network transceiver 666 may be an LPWA transceiver that follows the IEEE 802.15.4, or IEEE 802.15.4g standards, among others. The edge computing node 650 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 666, as described herein. For example, the transceiver 666 may include a cellular transceiver that uses spread spectrum (SPA/SAS) communications for implementing high-speed communications. Further, any number of other protocols may be used, such as Wi-Fi® networks for medium speed communications and provision of network communications. The transceiver 666 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 668 may be included to provide a wired communication to nodes of the edge cloud 690 or to other devices, such as the connected edge devices 662 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 668 may be included to enable connecting to a second network, for example, a first NIC 668 providing communications to the cloud over Ethernet, and a second NIC 668 providing communications to other devices over another type of network.

Given the variety of types of applicable communications from the device to another component or network, applicable communications circuitry used by the device may include or be embodied by any one or more of components 664, 666, 668, or 670. Accordingly, in various examples, applicable means for communicating (e.g., receiving, transmitting, etc.) may be embodied by such communications circuitry.

The edge computing node 650 may include or be coupled to acceleration circuitry 664, which may be embodied by one or more AI accelerators, a neural compute stick, neuromorphic hardware, an FPGA, an arrangement of GPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. Accordingly, in various examples, applicable means for acceleration may be embodied by such acceleration circuitry.

The interconnect 656 may couple the processor 652 to a sensor hub or external interface 670 that is used to connect additional devices or subsystems. The devices may include sensors 672, such as accelerometers, level sensors, flow sensors, optical light sensors, camera sensors, temperature sensors, a global positioning system (GPS) sensors, pressure sensors, barometric pressure sensors, and the like. The hub or interface 670 further may be used to connect the edge computing node 650 to actuators 674, such as power switches, valve actuators, an audible sound generator, a visual warning device, and the like.

In some optional examples, various input/output (I/O) devices may be present within or connected to, the edge computing node 650. For example, a display or other output device 684 may be included to show information, such as sensor readings or actuator position. An input device 686, such as a touch screen or keypad may be included to accept input. An output device 684 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge computing node 650.

A battery 676 may power the edge computing node 650, although, in examples in which the edge computing node 650 is mounted in a fixed location, it may have a power supply coupled to an electrical grid. The battery 676 may be a lithium ion battery, or a metal-air battery, such as a zinc-air battery, an aluminum-air battery, a lithium-air battery, and the like.

A battery monitor/charger 678 may be included in the edge computing node 650 to track the state of charge (SoCh) of the battery 676. The battery monitor/charger 678 may be used to monitor other parameters of the battery 676 to provide failure predictions, such as the state of health (SoH) and the state of function (SoF) of the battery 676. The battery monitor/charger 678 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 678 may communicate the information on the battery 676 to the processor 652 over the interconnect 656. The battery monitor/charger 678 may also include an analog-to-digital (ADC) converter that enables the processor 652 to directly monitor the voltage of the battery 676 or the current flow from the battery 676. The battery parameters may be used to determine actions that the edge computing node 650 may perform, such as transmission frequency, mesh network operation, sensing frequency, and the like.

A power block 680, or other power supply coupled to a grid, may be coupled with the battery monitor/charger 678 to charge the battery 676. In some examples, the power block 680 may be replaced with a wireless power receiver to obtain the power wirelessly, for example, through a loop antenna in the edge computing node 650. A wireless battery charging circuit, such as an LTC4020 chip from Linear Technologies of Milpitas, Calif., among others, may be included in the battery monitor/charger 678. The specific charging circuits may be selected based on the size of the battery 676, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 658 may include instructions 682 in the form of software, firmware, or hardware commands to implement the techniques described herein. Although such instructions 682 are shown as code blocks included in the memory 654 and the storage 658, it may be understood that any of the code blocks may be replaced with hardwired circuits, for example, built into an application specific integrated circuit (ASIC).

In an example, the instructions 682 provided via the memory 654, the storage 658, or the processor 652 may be embodied as a non-transitory, machine-readable medium 660 including code to direct the processor 652 to perform electronic operations in the edge computing node 650. The processor 652 may access the non-transitory, machine-readable medium 660 over the interconnect 656. For instance, the non-transitory, machine-readable medium 660 may be embodied by devices described for the storage 658 or may include specific storage units such as optical disks, flash drives, or any number of other hardware devices. The non-transitory, machine-readable medium 660 may include instructions to direct the processor 652 to perform a specific sequence or flow of actions, for example, as described with respect to the flowchart(s) and block diagram(s) of operations and functionality depicted above. As used in, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Each of the block diagrams of FIGS. 6A and 6B are intended to depict a high-level view of components of a device, subsystem, or arrangement of an edge computing node. However, it will be understood that some of the components shown may be omitted, additional components may be present, and a different arrangement of the components shown may occur in other implementations.

Edge Platform Architectures

One of the challenges from an edge platform architecture deployment perspective, is identifying a right platform architecture or design that can satisfy varying requirements (and, potentially, conflicting requirements). One of the primary requirements is imposed by location, to utilize an edge platform at a location that is located close (geographically or on a network) to meet latency requirements for a service or application. One of the secondary requirements is imposed by the workloads and users themselves, and the types of workloads, content of the workloads, user requirements for the workloads, etc. In this context, an edge platform architecture has to be capable of satisfying the required performance based on metrics (e.g., performance per watt), with appropriate compute schemes (e.g., using CPU offload or specialized acceleration), all while using an appropriate amount of resources (which may vary over time).

Figure 7:
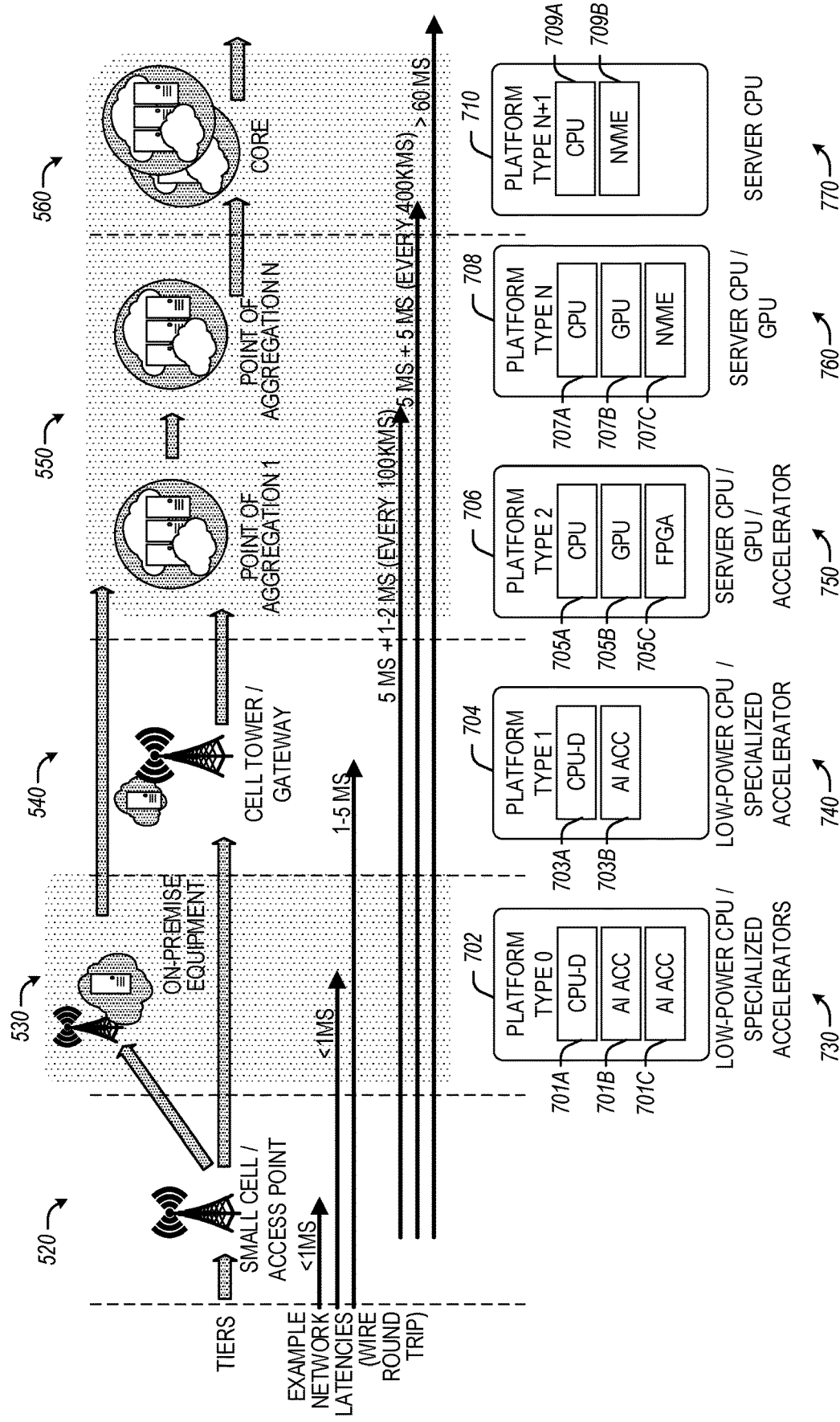
FIG. 7 illustrates a block diagram depicting mapping of edge computing hardware configurations to operational deployments and latencies in network layers, according to an example.

FIG. 7 illustrates a mapping of edge computing hardware configurations to operational deployments and latencies in network layers, based on a mapping of hardware platforms 730, 740, 750, and 760 to various layers 530, 540, 550 of the edge cloud and beyond (extending the operational network layer examples discussed above for FIG. 5). For instance, at layer 530, a combination of low-powered CPUs with multiple specialized accelerators (hardware 730) may provide a first platform type 702 (composed of multiple components 701A, 701B, 701C) suitable for execution of on-premise services (e.g., cloudlets/edgelets/or other applets requiring extremely low latency, under a millisecond). At layer 540, a similar combination of low-powered CPUs with a specialized accelerator (hardware 740) may provide a second platform type 704 (composed of multiple components 703A, 703B) suitable for low-power execution of services for multiple types of devices (e.g., requiring low latency under 5 ms). Deeper into the network, a combination of server-class CPUs with specialized GPUs and accelerators (hardware 750) or storage (hardware 760) may be provided at the network access or aggregation layer 550, to provide a third and fourth platform type (platform 706 composed of multiple components 705A, 705B, 705C, and platform 708 composed of multiple components 707A, 707B, 707C). Finally, beyond the edge cloud, multi-core server CPUs and storage (hardware 770) may be provided at the core network layer 540 to enable the availability of server-class (cloud) processing but with the tradeoff of higher latencies, provided with a fifth platform type (platform 710 composed of multiple components 709A, 709B).

The following use of chiplets enables the integration and deployment of new technologies without the need to fully replace existing deployments. A new chiplet configuration may be deployed at the nodes or equipment of any of the layers 520, 530, 540, 550, 560 in order to utilize specific platform types, acceleration hardware, compute resources, storage resources, based on the particular type of workloads being encountered at that particular layer at that particular time.

Figure 8:
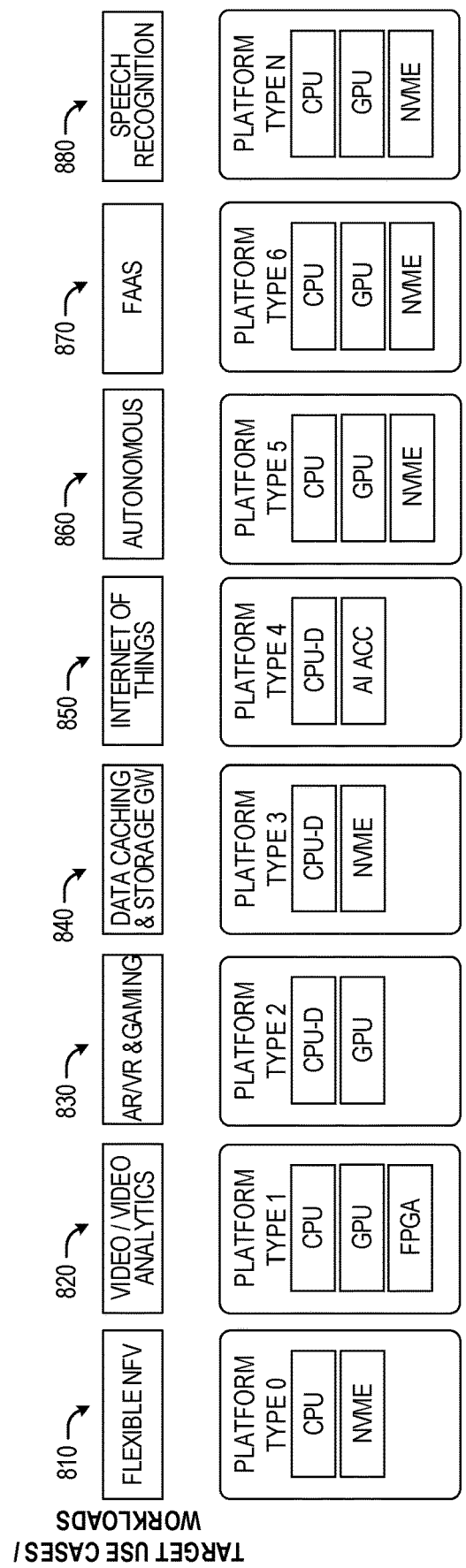
FIG. 8 illustrates a block diagram depicting a mapping of use cases and workloads to operational deployments of edge computing hardware configurations, according to an example.

FIG. 8 illustrates further mapping of use cases and workloads to operational deployments of edge computing hardware configurations. Specifically, FIG. 8 shows how different workloads relevant to the edge cloud, each with varying requirements, applications and value propositions, may be matched to different hardware combinations offered by one or more service providers.

As shown in FIG. 8, various types of use cases and workloads may be mapped to different platform types, based on the selection or reconfiguration of hardware configurations. For example a flexible NFV workload 810 may be mapped to a first platform type providing CPU and storage resources; a video processing or video analytics workload 820 may be mapped to a second platform type providing low-power CPU and specialized GPU and FPGA processing; AR/VR and gaming workloads 830 may be mapped to a third platform type providing CPU and storage resources; data caching and storage gateway workloads 840 may be mapped to a fourth platform type providing low-power CPU and storage resources; internet of things processing 850 may be mapped to a fifth platform type providing low-power CPU and AI acceleration resources; autonomous vehicle workloads 860 and function-as-a-service workloads 870 may be mapped to sixth and seventh platform types providing CPU, storage, and specialized GPU processing resources; speech recognition workloads 880 may be mapped to an Nth platform type having CPU and storage resources, and specialized GPU processing; etc. Each of these workloads may have different requirements and constraints that are satisfied when decoupling compute, acceleration and storage resources. These requirements, when matched with decoupled resources, motivate composable architectures that are highly flexible and heterogeneous, and which can be deployed in different environmental conditions.

Different locations may be usable across the edge cloud 110 to perform services management, as resources are mapped to the workload data, and workload data instances are mapped to the resources, including with the use of decoupled resources as discussed herein. In a highly distributed architecture, the features may be determined from mapping services on the base station or other network gateway location. For instance, the platform physical requirements in terms of power and space may limit the amount of hardware that can be placed in a particular edge node. Furthermore, in order to obtain more service density, acceleration schemes such as hardware inference acceleration may be utilized. In a central office architecture, the architecture is less distributed, but less power and space constrained according to the capabilities and servicing location of the central office. In this case, with fewer space and power constraints, the architectural solution can be more homogenous at the cost of sacrificing some degree of performance or service density.

It should be understood that initial workload mapping may not be effective for runtime activities during the lifecycle of the workload or in the construct of a workflow. Additional services that should be enabled are the workload assessment as a service, which can provide the assessment and reallocation of a workload based on over time characterization of the workload. Based on this, a workload may be migrated to another location or another hardware or system configuration in order to support the workload needs. Thus, not only may individual nodes have decoupled resources, but the workload processing itself may be treated in a decoupled manner as workloads and utilized across different layers of the network.

Disaggregated I/O Chiplet Configuration Examples

The following sections provide a detailed discussion of an edge computing configuration for chiplets. These chiplets may be implemented to provide a specialized platform, circuitry, CPU, SoC, or cluster or group of such components within a particular edge computing device, node, system, or other organized entity.

One aspect of the following provides a flexible architecture that allows a given edge location platform to be configured based on current workload mapping and physical requirements (e.g., power, bandwidth, etc.). This flexible architecture also allows expansion and change based on future requirements, changes on-demand by the user, the appearance on new technologies, or new workloads. To achieve this goal, the following architectural design implements I/O disaggregation (IOD) for different types of resources.

In an example, IOD is applied for configurable chiplets that are located within processing circuitry (e.g., a CPU, SoC). Such processing circuitry can be modified into discrete arrangements based on the configurable chiplets located inside the device. The particular manner of configuration within the processing circuitry itself, and the adaptation of such chiplets into particular flavors for edge computing workloads, distinguishes the present configuration from more conventional standard rack scale design or disaggregation of hardware resources.

Further, in the following examples, IOD is specifically adapted to enable static decoupling of compute resources from other resources. This allows dynamic reassembly of components into a hardware virtualized node (called a "composite node" in the following examples). Composite Nodes (CNs) expose discrete resources, such as storage and accelerator resources, as local physical elements despite being located in a different area of a server rack or computing system. The discrete resources are connected via a bus or other interconnect, and can be arranged, enabled, or called on in an on-demand fashion.

As suggested above, many edge compute architectures do not provide efficient hardware support schemes to implement complex service chains. In many scenarios, applications are implemented as chains or pipelines of services that require the CPU to act as the main orchestration element within a system. Hence, the CPU or compute resources are responsible for managing all of the data plane and control plane (in many cases, requiring thousands of data movements from a device to the CPU and memory) among the different services belonging to the application that are hosted in multiple devices. For instance, an application doing analytics on camera video data may: utilize a network interface card (NIC) which consumes data received from the cameras; send video frames to a graphics processing unit (GPU) to perform transcoding; send transcoded raw data to an AI accelerator to perform inferencing; send meta-data generated from the AI accelerator to a FPGA performing analytics; and other types of operations.

The use of disaggregated I/O with chiplets addresses the limitations in this and other scenarios by providing high integration of disaggregated devices that meets multiple operational criterion. The following chiplet configuration and use of disaggregated components may be deployed in a secure location, in hardware, and can be security verified. The chiplet configuration and use of the disaggregated components also provide a finer grain unit of compute with respect to existing approaches using a new modular I/O configuration. Third, the chiplet configuration and use of the disaggregated components allows complex system configurations and connections to be created, deployed, or updated.

As discussed herein, the following types of I/O disaggregation are designed to be tightly integrated with a CPU and computing platform architecture. This disaggregation is especially relevant in the context of edge architectures where physical integration may be relevant to provide a more efficient per-watt and form factor solution at a particular location (e.g., as discussed above with reference to FIGS. 7 and 8).

The deployment of chiplets for edge compute processing, in the current examples, also enables support of multiplexing. For instance, each CPU's digital signals may be buffered and multiplexed against pooled analog I/O resources (and treated as multi-node shared), or against pooled digital acceleration resources. Either type of polling may be performed by integrating the muxing/demux-ing/switching into silicon of the computing system.

The deployment of chiplets, in the current examples, also enables variable encryption/decryption and encoding/decoding capabilities into modular I/O. This type of operation may be assisted by providing and using buffering to support ultra-low power operation of I/O interfaces. The deployment of chiplets also may implement different topologies to the disaggregated I/O modules. For instances, instead of having a direct connection from the core to a GPU, the I/O connection can be seen as multi-hop journey where each hop traverses a particular I/O device and travels to the next hop (I/O device) using a I/O network (e.g., in the form of peer-to-peer routing).

With a new CPU interface that supports the common digital signaling types, hardware module components can be interchanged in systems to configure capabilities as needed. In communications applications this would mean the primary interface types would include native CPU interfaces. Low-cost and low-complexity modules translate the analog domains to the digital format that the CPU interface can support. Acceleration modules can also be added using Compute Express Link (CXL) or peripheral component interconnect express (PCIe) interconnect. Other forms of connections and interfaces may also be used with the following chipset approach.

Advanced chiplet designs also can accommodate disaggregated I/O modules so that the I/O controller logic resides on a dedicated chiplet to achieve hardware modularity. An FPGA design can implement the I/O controller function to accelerate delivery of a modular I/O solution when a chiplet solution is not ready/available. The use of various logic features within a modular I/O block, as discussed below, allows multiple types of configurations that are flexible to serve a variety of edge computing use cases, including FaaS and EaaS.

In an example, the modular I/O of the computing platform may be configured, on-the-fly, to produce a new configuration that is implemented on the order of nanoseconds or microseconds. For example, with the use of some FaaS/EaaS implementations, the available CPU computing resources may be reconfigured every n milliseconds; or in other examples, the reconfiguration may be based on the movement or migration of workloads, on the order of minutes or hours. Additionally, on-the-fly configuration may enable a computing platform to change over time, such as with a virtual CPU that starts with n chiplet at one time (e.g., in morning), with the addition of more chiplets to the virtual CPU as the load increases. Other configurations may result as the chiplet usage and configuration elastically increases or decreases depending on the demand.

Security features may be used to process a workload that runs on virtual platform which is assembled from one or multiple CPUs with one or multiple chiplets. For instance, attestation and RoT logic can be used to validate that the particular chiplets (and chiplet connections) are valid, including with verification of signatures of the chiplets. Chiplets may implement a hardware RoT (e.g., using DICE) containing a Unique Device Secret (UDS) within fuses, physical unclonable functions (PUFs), or read-only memory (ROM) gates that uniquely identify the chiplet and support other security features as applicable.

Figure 9:
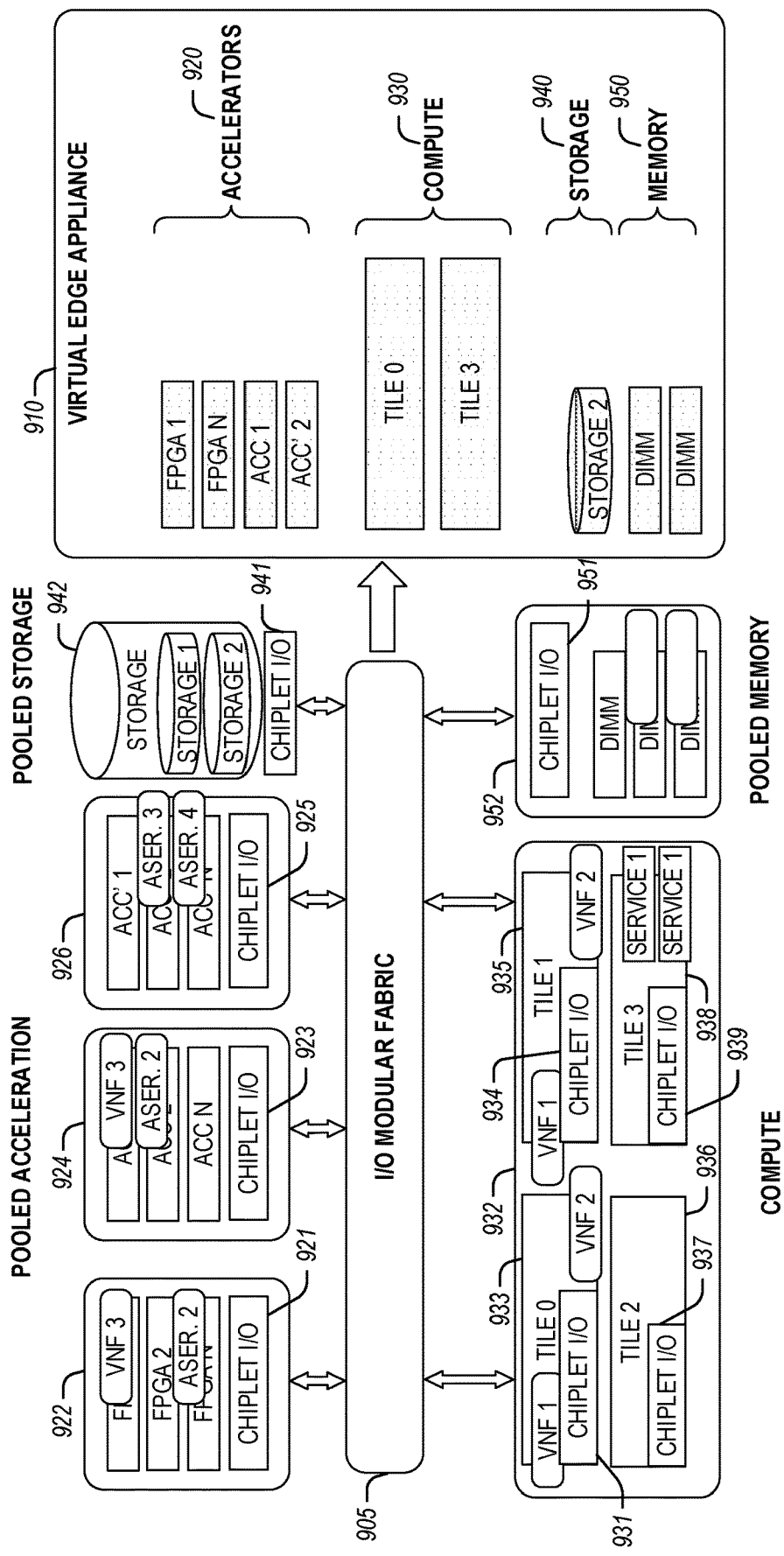
FIG. 9 illustrates a block diagram of a virtual edge appliance configured using modular I/O components, according to an example.

FIG. 9 illustrates a block diagram of a virtual edge appliance 910 configured using modular I/O components. Specifically, within the depiction of FIG. 9, a configurable, modular I/O fabric 905 connects a number of pooled acceleration (922, 924, 926), compute (932), storage (942), and memory (952) resources from among a larger pool of available resources. These resources are configured with the use of the fabric 905 to establish a virtual edge appliance 910, which provides a virtual CPU configuration for workloads, functions, applications, and services, with use of a number of acceleration, compute, storage, and memory resources in a particular processing configuration. Usage of such functions and services among different portions of the resources are depicted throughout FIG. 9.

The virtual edge appliance 910 is depicted as being composed of a specific combination of accelerators 920, compute resources 930, storage resources 940, and memory resources 950. It will be understood that the type and number of acceleration, storage, compute, and memory resources connected to the fabric 905 is provided for purposes of illustration, and that additional or fewer resources (or types of resources) may be provided in a particular computing system platform or deployment.

Each of the resource components within the CPU or computing platform (compute, memory, storage or acceleration) include a new interface (Chiplet I/O) for connection to the modular fabric 905. Each interface implements logic that is responsible to perform registration, management, and connection of the particular resource and chiplets or other sub-components within the particular resource. For instance, within the arrangement of FIG. 9, individual resources are connected to the modular fabric 905 through the use of respective chiplet I/O interfaces, such as: chiplet I/O interfaces 921, 923, 925 for connecting pooled acceleration resources 922, 924, 926 respectively; chiplet I/O interface 941 for connecting pooled storage resources 942; chiplet I/O interfaces 931, 934, 937, 939 for connecting compute tile resources 933, 935, 936, 938; and chiplet I/O interface 951 for connecting pooled memory resources 952. The specific chiplet configuration at each of the I/O controls is used to assemble the various components into the appliance 910.

Figure 10:
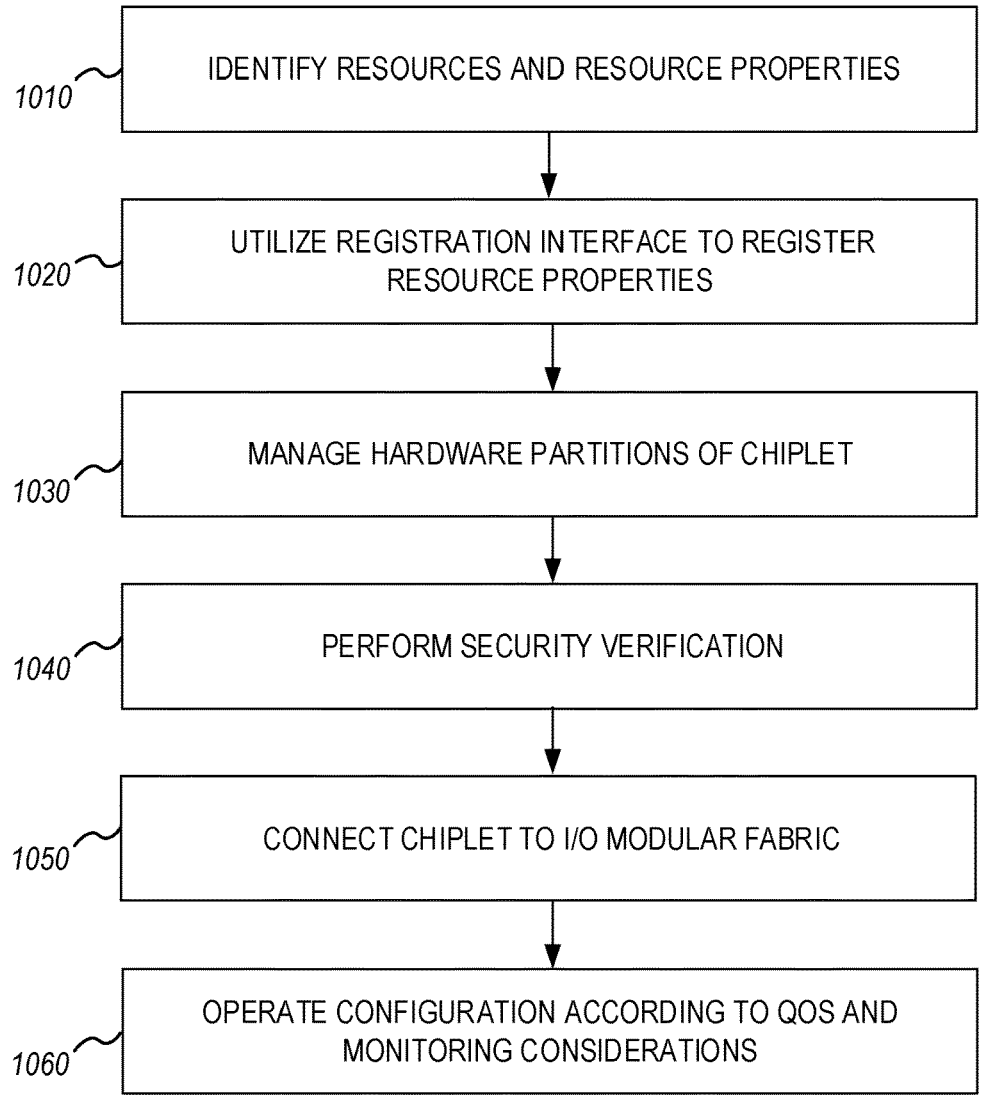
FIG. 10 illustrates a flowchart of a process for configuring and deploying an edge computing system based on modular I/O components, according to an example.

FIG. 10 illustrates a flowchart 1000 of a process for configuring and deploying a virtual edge computing platform in a computing system, based on modular I/O chiplets and like configurations. For instance, this process may be used to establish the configuration of the virtual edge appliance 910 depicted in FIG. 9, with a particular combination of modular resources (with these resources being composed of adaptable chiplets). This configuration and deployment process may be provided with use of logic within various locations of the appliance resources and fabric, such as with logic implemented at individual I/O interfaces (e.g., 921, 923, 925, 931, etc.), by logic implemented within features of the fabric 905, by a platform orchestrator, or by other components within or coupled to the computing platform.

The flowchart 1000 begins with an operation to identify available configurable resources and resource properties (operation 1010), such as with use of a discovery interface or discovery logic. The physical and logical properties of the resources—such as available configurations provided by chiplets at the resource—may then be registered using a registration interface associated with the particular resource or fabric (operation 1020). In some examples, a resource may include chiplets that are configurable or programmable (e.g., at an acceleration resource that includes one or more FPGAs), and the registration may involve identification and registration of such configuration or programming state or capabilities. During runtime, the characteristics of the chiplets may change, and the use of registration may enable notification and tracking of these changes.

The flowchart 1000 continues with operations to manage hardware partitions of the chiplet and chiplet I/O components (operation 1030). Different partitions of the cluster may correspond to a partition that is dynamically created and associated to an application with a particular process address ID (PASID).

The flowchart 1000 continues with operations to perform security verification of respective chiplets or chiplet configurations (operation 1040), and to connect the chiplet to the I/O modular fabric (operation 1050). The connection may imply agreeing on new different type of connection configurations. For instance, a connection configuration may be based on defining different speeds or protocols. In these and other examples, such chiplets can be local or discrete chiplets.

The flowchart 1000 concludes with the use of the resource according to the particular chiplet configuration, based on quality of service and monitoring considerations (operation 1060). These quality of service and monitoring features may allow re-configuration or modification to the chiplet configuration, including on-the-fly re-configuration based on QoS or other considerations.

The type of security verifications that are performed (e.g., in connection with operation 1040) may include polling an internal bus to determine if the expected number, type and configuration of the tile or chiplet exists. Security verifications may also include re-configuring, resetting, clearing or re-installing firmware on the tile or chiplet, to return to a known or acceptable state.

In a further example, the controller that performs these operations may be a RoT on the respective resources 922, 932 . . . or 952 (e.g., resources provided by respective IP-Blocks). Additionally, the platform may include another IP-Block (not shown) or re-use an existing IP-Block which contains the logic for configuring the virtual Edge Appliance according to the description herein, as such logic is used to perform physical partitioning and allocation/deallocation operations. For example, a controller or IP-block may contain a table of available hardware resources (e.g. tiles, chiplets, etc. . . . ) with an assignment to one or more virtual edge appliances assigned to this node. Further, the table may be protected in flash storage or other secure (e.g., isolated) storage that is under the exclusive control of a security IP-Block element or a sub-element of an existing IP-Block.

Figure 11:
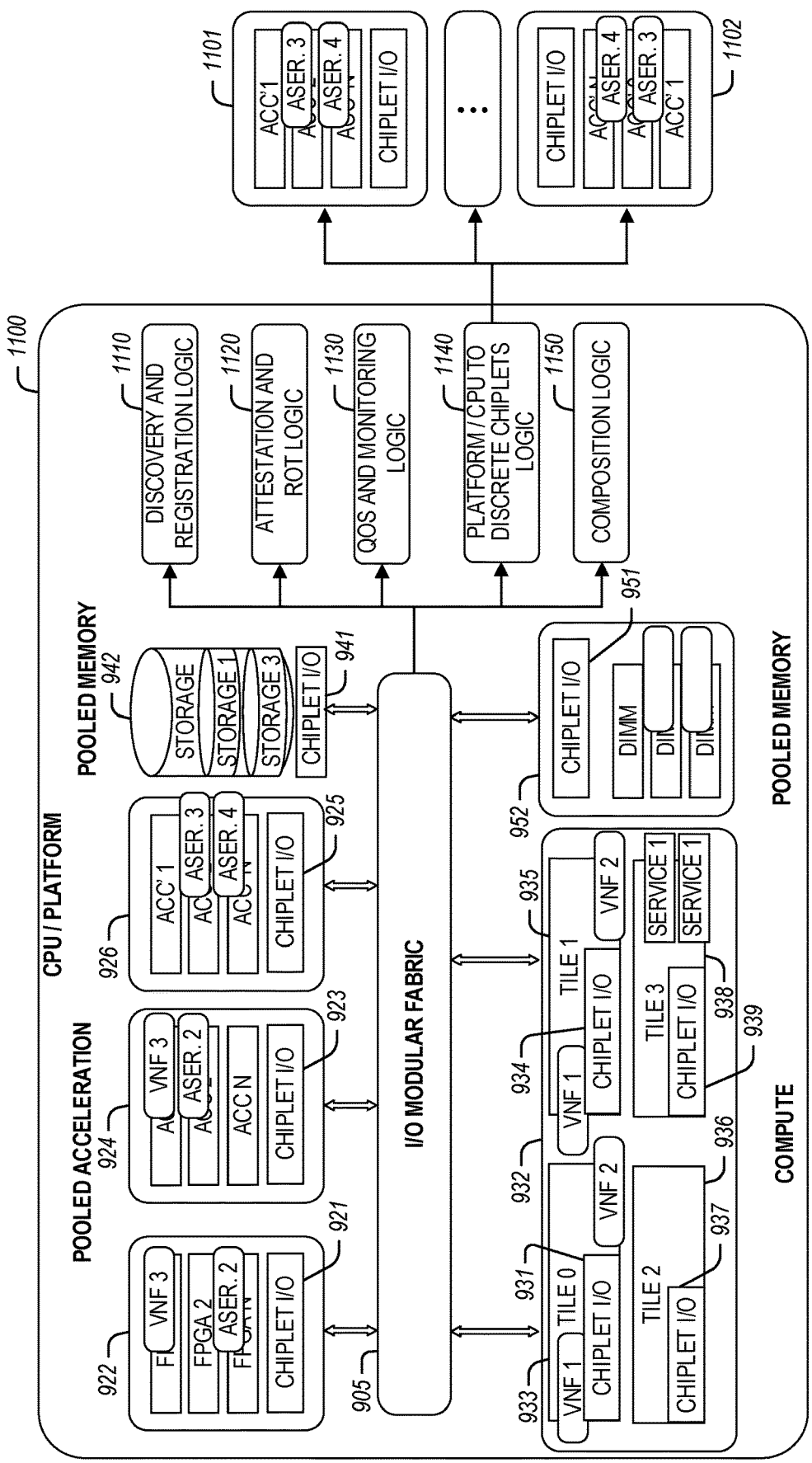
FIG. 11 illustrates a block diagram of an edge computing platform configured using modular I/O chiplets, according to an example.

FIG. 11 illustrates a block diagram of an edge computing platform (e.g., platform 1100) configured using modular I/O chiplets. Specifically, this diagram illustrates an extension of the platform depicted in FIG. 9, with additional incorporation of logic elements to accomplish a modular I/O and integrated architecture.

Within FIG. 11, additional components of the CPU or platform architecture are identified to support the logic operations within the I/O modular fabric 905. In an example, the fabric 905 is responsible to connect all the different chiplets and its responsible to discover and negotiate connection characteristics of the various chiplet I/Os to the fabric. The I/O modular fabric 905 also may implement end-to-end quality of service policies for a collection of chiplets associated to a particular virtual partition.

In one configuration of FIG. 11, the fabric 905 includes an integrated component (IP block or IP core) that implements logic for the following chipset features; however, the logic may be also implemented within the use of a configuration component or other core/block not shown in the platform 1100. In still other examples, some of the following functions may be implemented by a security core/block (e.g., a S3M (security and manageability) or server PFR (platform firmware resiliency) block).

The chipset logic features for the fabric 905 may include:

Discovery and Registration Logic 1110. In an example, the Logic 1110 is responsible to provide functionalities and the corresponding interfaces related to registration and discovery. For registration, this logic enables the chiplets to register their functionalities and characteristics. Applicable registration information may include chiplet properties such as type of function (e.g., x86, FPGA, etc.), physical properties (protocols, power, etc. used by the component) and service level agreement (SLA) functionalities. Applicable discovery information may include enabling the system software stack (management) to discover information in order to decide what type of composition of the resource can be made. The discovery information may also enable the user software stack to discover functionalities provided for the chiplets associated to its partition.

Platform/CPU Chiplet Mapping Logic 1140. In an example, the Chiplet Mapping Logic 1140 is responsible to expose and implement interfaces to a system software stack in order to create a virtual partition of the multiple chiplets that can be associated to one tenant within a particular CPU or platform (e.g., on a hardware system basis). A virtual partition may include: a set of discrete chiplets associated to the virtual partition (Per each of the chiplets); a potential SLA (i.e.: 10 Gbps of bandwidth to memory); a hardware configuration (power, frequency etc.); and a list of service level agreements per each of the chiplets attached to the partition. The SLA can be defined in terms of latency or bandwidth, or both. The Chiplet Mapping Logic 1140 is shown as mapping to multiple partitions of acceleration components, including acceleration units 1101 and 1102.

QoS and Monitoring Logic 1130. In an example, the QoS and Monitoring Logic 1130 is responsible to monitor and enforce the configuration of a particular CNF. Note that in this case, the CNF hardware allocation may only be enforced by hardware when the SLA associated to a particular CNF cannot be achieved. In further examples, the QoS and monitoring logic provides virtual functions that are associated to a particular SLA for a particular workload. Additionally, the QoS and monitoring logic 1130 can be separated per virtual partition or per group of partitions. For instance, tenant A may have a SLA budget of X, while tenant A owns CNF1 and CNF2; the system may be enabled to share the budget for X across the two instances.

The QoS and monitoring functions may invoke different resources based on the input or the workload that goes into the service running on a particular platform/virtual CPU. For example, if the workload coming to the service is processing 60 frames per second (fps) video data, then X resources may be needed; if the service is needing to process 120 fps, then X*2 resources may be needed; etc. These and similar functions may be built into the QoS monitoring logic, to enable a workload for a particular service the QoS can scale up and scale down for CPU capabilities with composition logic (discussed as follows).

Composition logic 1150. The composition logic 1150 is responsible to configure the correct connectivity between each of the chiplets associated to a partition or CNF and the chiplets itself. This composition logic uses features of the discovery and registration logic 1110 in order to understand what the properties are associated to each of the chiplets.

Attestation and Root-of-trust logic (ROT) 1120. A variety of forms of security and attestation features may be implemented to verify proper operation and use of trusted hardware. In an example, the UDS follows a DICE architecture by generating attestable identities using the resource pooling firmware. In the case of a FPGA resource, the bitstream designs can be measured into the DICE key generation function. The chiplets cooperate to attest their identities to a platform verifier. DICE layering is applied or reapplied as necessary to accommodate dynamics of chiplet reassignment. Firmware that may be used with the CNF is measured and incorporated into the RoT keys.

Within the larger context of a configurable computing platform arrangement, such as with use of a rack scale design, the verifier could be a baseboard management controller (BMC) or another control point in the rack scale design abstraction. The verifier checks that each chiplet reports its identity and attests its configuration as a condition of silicon startup and chiplet configuration. The verifier may also verify the expected mix of pooled resources that exist for a given tenant. Tenant-specific resource partitioning and isolation can be retained within the context of a CNF as variable encryption/decryption/authentication is supported using keys that are derived from the appropriate chiplet and DICE layers. If each chiplet contained a DICE RoT that produces an attestation key, then every possible chiplet configuration could be positivity identified and attested to a verifier that contains a policy describing acceptable or unacceptable configurations. This approach to security scales with the same degree of flexibility inherent to the CNF design.

In further examples, each block/core in the platform (e.g., each block in the SoC) may have its own DICE RoT. In this scenario, the attestation and RoT logic 1120 may be implemented by a specialized RoT (e.g., a SoC-RoT) that accepts attestations and tests the authenticity of the respective resident DICE RoTs (e.g., with security verification operations discussed herein).

Although the platform 1100 configuration suggests the use of a SoC or other hardware platform, other discrete devices may be configured on the same computing platform. For instance, the RoT may be a Platform Active RoT (PaRoT) such as is defined in Open Compute Project/Cerberus standards.

Figure 12:
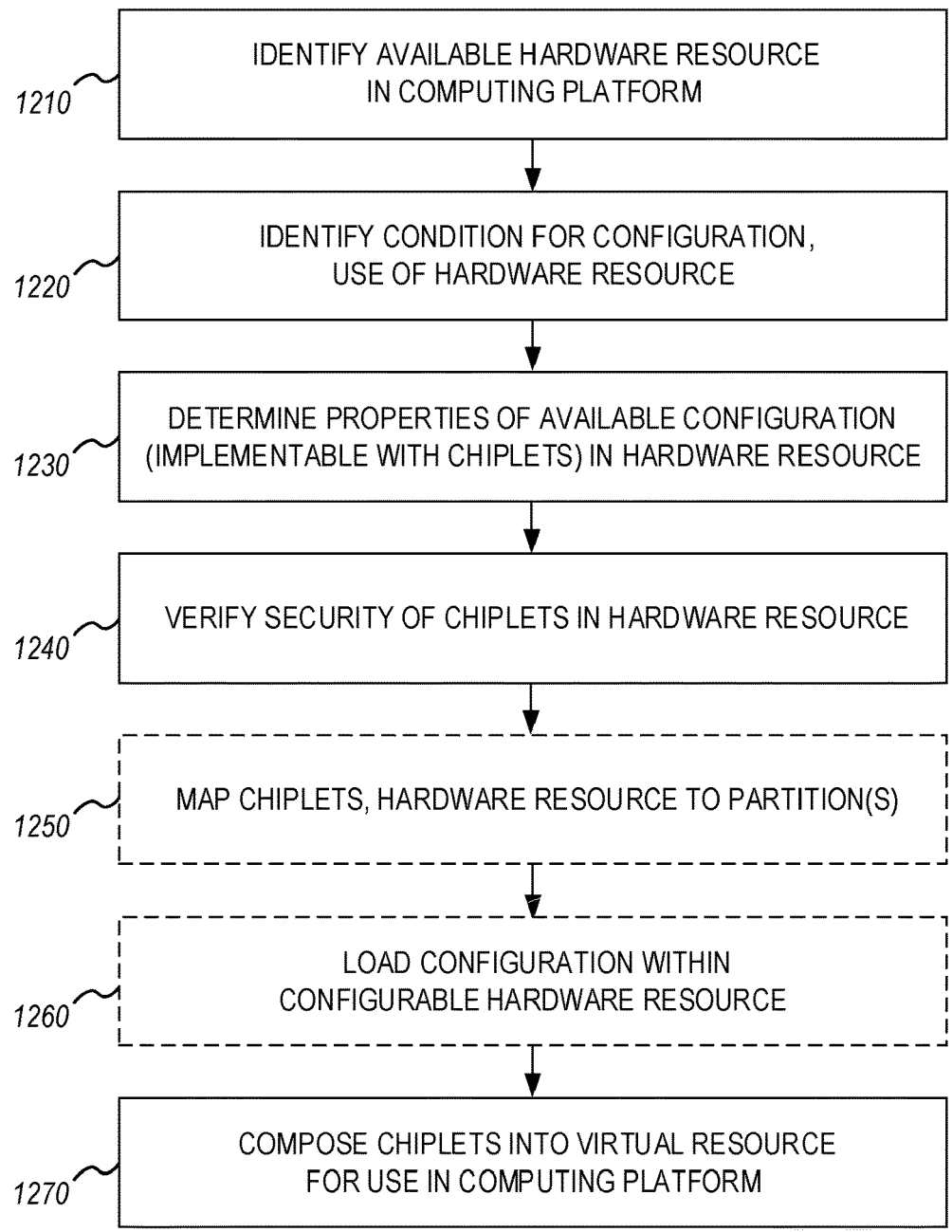
FIG. 12 illustrates a flowchart of an example process for deploying and utilizing configurable chiplet resources within an edge computing platform, according to an example.

FIG. 12 illustrates a flowchart 1200 of an example process for deploying and utilizing configurable chiplet resources within an edge computing platform, according to an example. The following flowchart 1200 is illustrated from the perspective of an edge computing device which includes a number of configurable chiplet-based resources, with the configuration of such resources being provided to host or fulfill usage of the resources (e.g., as part of an edge computing service, workload usage, etc.). However, it will be understood that other corresponding operations may also be implemented by or on behalf of other entities, or within other components of the hardware itself.

The flowchart 1200 begins with operation 1210, performed by the hardware platform, to identify an available resource (or resources) in the computing platform. Specifically, this identification may identify which resource is available (or, what extent that a resource is available) in the edge computing device to be used for an edge computing workload, as part of a platform configuration. In various examples, the hardware resource includes at least one of: compute resources; pooled acceleration resources; pooled memory resources; pooled storage resources; or other resource types or arrangements as discussed above.

The flowchart 1200 continues with operation 1220, to identify a condition for configuration and use of the hardware resource. This condition may be based on an edge computing workload (or workloads, or other forms of service operations or data), received at or processed by the edge computing device.

The flowchart 1200 continues with operation 1230, to obtain or otherwise determine properties of available configuration (implementable with chiplets) in the hardware resource. Such configuration may be evaluated based on whether the hardware resource is available, configurable, or optimized to satisfy the condition for use of the hardware resource. Such conditions may be tied to larger use of the systems and system services, such as in the context of an SLA, SLOs, or other objectives or service characteristics.

The flowchart 1200 continues with operation 1240, to verify security of the chiplets in the hardware resource. In a specific example, operations are performed to enabled to verify attestation of the chiplets, using root of trust logic implemented by the modular fabric, and based on attestation provided from the chiplets. Further, operations may be performed to verify an identity and configuration of the respective chiplets.

The flowchart 1200 continues with optional operation 1250, to map chiplets and hardware resources to one or more partitions. In a specific example, such mapping is established with the use of a virtual partition of at least a portion of the chiplets based on association with a particular tenant, and a service level agreement associated with the particular tenant, as circuitry involving the chiplets is configured to map a portion of the chiplets of the hardware resource to the virtual partition.

The flowchart 1200 continues with optional operation 1260, to load a configuration within a configurable hardware resource (such as a FPGA). For instance, in a scenario where the hardware resource itself is configurable among multiple states or configurations, then a configuration for the configurable resource may be identified and loaded onto the configurable resource.

The flowchart 1200 continues at operation 1270 by composing the chiplets of the hardware resource into a virtual resource, for use in the computing platform. In an example, the composition of the chiplets into the configuration produces a virtual edge appliance for handling the edge computing workload on behalf of a tenant, as the virtual edge appliance provides use of one or more of: a portion of accelerator components from the pooled acceleration resources, a portion of compute components from the compute resources, a portion of the memory from the pooled memory resources, and a portion of the storage from the pooled storage resources.

Additionally, in further examples, the chiplets may be composed to provide a composed node flavor (implemented as a particular one of a plurality of composed node flavors), with respective node flavors of the plurality of composed node flavors corresponding to respective types of workloads to be processed by the edge computing device. In this fashion, the respective node flavors provide variations in type and amount of resources used for processing the respective types of workloads.

In various examples, the operations 1210-1270 may be performed by aspects of a modular fabric within configured circuitry, as the modular fabric is configured to coordinate the chiplets for use as a virtual computing platform. Further, such operations may be implemented at individual chiplet resources with a chiplet I/O interface to the modular fabric, as the chiplet I/O interface is configured to enable registration of the properties of the chiplets, manage hardware partitions of the chiplets, and connect the chiplets to the modular fabric.

Likewise, use of the modular fabric may include the implementation of various logic for performing the operations 1210-1270, including logic to: perform discovery and registration of the chiplets, identify available compositions of the chiplets, and enable a user software stack to discover functionality provided for the chiplets; perform virtual partitioning and mapping to an identified virtual partition; verify attestation and verify an identity and configuration of chiplets; and monitor and enforce the configuration of the chiplets in the hardware resource, based on a composed node flavor of the virtual computing platform for a particular workload to be processed by the edge computing device.

Implementation of the preceding techniques may be accomplished through any number of specifications, configurations, or example deployments of hardware and software. It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

ADDITIONAL NOTES & EXAMPLES

Additional examples of the presently described method, system, and device embodiments include the following, non-limiting configurations. Each of the non-limiting examples may stand on its own, or may be combined in any permutation or combination with any one or more of the other examples provided below or throughout the present disclosure.

Example 1 is an edge computing device in an edge computing system, comprising: at least one hardware resource, the hardware resource composed from a configuration of a plurality of chiplets, wherein the chiplets provide disaggregated portions of the hardware resource; and circuitry configured to perform operations to: identify a condition for use of the hardware resource, based on an edge computing workload received at the edge computing device; obtain, identify, or determine properties of a configuration for the hardware resource that are available to be implemented with the chiplets, the configuration enabling the hardware resource to satisfy the condition for use of the hardware resource; and compose the chiplets into the configuration, according to the properties of the configuration, to enable the use of the hardware resource for the edge computing workload.

In Example 2, the subject matter of Example 1 includes, the circuitry further configured to perform operations to: identify the hardware resource as available in the edge computing device to be used for the edge computing workload according to the configuration.

In Example 3, the subject matter of Example 2 includes, the circuitry further configured to perform operations to: verify the configuration of the chiplets in the hardware resource, wherein the chiplets provide attestation for the use of the hardware resource with the edge computing workload according to the configuration.

In Example 4, the subject matter of Examples 1-3 includes, wherein the hardware resource comprises at least one of: compute resources; pooled acceleration resources; pooled memory resources; or pooled storage resources.

In Example 5, the subject matter of Example 4 includes, wherein composition of the chiplets into the configuration produces a virtual edge appliance for handling the edge computing workload on behalf of a tenant, and wherein the virtual edge appliance provides use of: a portion of accelerator components from the pooled acceleration resources, a portion of compute components from the compute resources, a portion of the memory from the pooled memory resources, and a portion of the storage from the pooled storage resources.

In Example 6, the subject matter of Examples 1-5 includes, wherein the hardware resource comprises a configurable resource, and wherein the circuitry is further configured to identify a configuration for the configurable resource and load the configuration onto the configurable resource.

In Example 7, the subject matter of Example 6 includes, wherein the configurable resource comprises field-programmable gate array (FPGA) circuitry.

In Example 8, the subject matter of Examples 1-7 includes, wherein the circuitry is provided from a modular fabric, wherein the modular fabric is configured to coordinate the chiplets for use as a virtual computing platform.

In Example 9, the subject matter of Example 8 includes, wherein the hardware resource includes a chiplet I/O interface to the modular fabric, the chiplet I/O interface configured to enable registration of the properties of the chiplets, manage hardware partitions of the chiplets, and connect the chiplets to the modular fabric.

In Example 10, the subject matter of Examples 8-9 includes, wherein the modular fabric is further configured to implement logic to: perform discovery and registration of the chiplets; identify available compositions of the chiplets; and enable a user software stack to discover functionality provided for the chiplets.

In Example 11, the subject matter of Examples 8-10 includes, wherein the modular fabric is further configured to implement logic to: create a virtual partition of at least a portion of the chiplets based on association with a particular tenant, and a service level agreement associated with the particular tenant; wherein the circuitry is further configured to map a portion of the chiplets of the hardware resource to the virtual partition.

In Example 12, the subject matter of Examples 8-11 includes, wherein the modular fabric is further configured to implement logic to: verify attestation of the chiplets, using root of trust logic implemented by the modular fabric, based on attestation provided from the chiplets.

In Example 13, the subject matter of Example 12 includes, wherein the modular fabric is further configured to implement logic to: verify an identity and configuration of the respective chiplets.

In Example 14, the subject matter of Examples 8-13 includes, wherein the modular fabric is further configured to implement logic to: monitor and enforce the configuration of the chiplets in the hardware resource, based on a composed node flavor of the virtual computing platform for a particular workload to be processed by the edge computing device.

In Example 15, the subject matter of Example 14 includes, wherein the composed node flavor is one of a plurality of composed node flavors, wherein respective node flavors of the plurality of composed node flavors correspond to respective types of workloads to be processed by the edge computing device, and wherein the respective node flavors provide variations in type and amount of resources used for processing the respective types of workloads.

In Example 16, the subject matter of Examples 1-15 includes, the circuitry configured to perform operations to: determine and save the properties of the configuration for the hardware resource that are available to be implemented with the chiplets; and reuse the configuration with a subsequent edge computing workload, in connection with the use of the hardware resource for the subsequent edge computing workload.

Example 17 is a method performed by an edge computing device, the edge computing device comprising at least one hardware resource composed from a configuration of a plurality of chiplets, and the method comprising: identifying a condition for use of the hardware resource, based on an edge computing workload received at the edge computing device; obtaining, identifying, or determining properties of a configuration for the hardware resource that are available to be implemented with the chiplets, the configuration enabling the hardware resource to satisfy the condition for use of the hardware resource; and composing the chiplets into the configuration, according to the properties of the configuration, to enable the use of the hardware resource for the edge computing workload.

In Example 18, the subject matter of Example 17 includes, identifying the hardware resource as available in the edge computing device to be used for the edge computing workload according to the configuration.

In Example 19, the subject matter of Example 18 includes, verifying the configuration of the chiplets in the hardware resource, wherein the chiplets provide attestation for the use of the hardware resource with the edge computing workload according to the configuration.

In Example 20, the subject matter of Examples 17-19 includes, wherein the hardware resource comprises at least one of: compute resources; pooled acceleration resources; pooled memory resources; or pooled storage resources.

In Example 21, the subject matter of Example 20 includes, wherein composition of the chiplets into the configuration produces a virtual edge appliance for handling the edge computing workload on behalf of a tenant, and wherein the virtual edge appliance provides use of: a portion of accelerator components from the pooled acceleration resources, a portion of compute components from the compute resources, a portion of the memory from the pooled memory resources, and a portion of the storage from the pooled storage resources.

In Example 22, the subject matter of Examples 17-21 includes, wherein the hardware resource comprises a configurable resource, the method further comprising: identifying a configuration for the configurable resource; and loading the configuration onto the configurable resource.

In Example 23, the subject matter of Example 22 includes, wherein the configurable resource comprises field-programmable gate array (FPGA) circuitry.

In Example 24, the subject matter of Examples 17-23 includes, wherein operations are performed by a modular fabric, wherein the modular fabric is configured to coordinate the chiplets for use as a virtual computing platform.

In Example 25, the subject matter of Example 24 includes, wherein the hardware resource includes a chiplet I/O interface to the modular fabric, the chiplet I/O interface configured to enable registration of the properties of the chiplets, manage hardware partitions of the chiplets, and connect the chiplets to the modular fabric.

In Example 26, the subject matter of Examples 24-25 includes, wherein the modular fabric is further configured to implement logic to: perform discovery and registration of the chiplets; identify available compositions of the chiplets; and enable a user software stack to discover functionality provided for the chiplets.

In Example 27, the subject matter of Examples 24-26 includes, wherein the modular fabric is further configured to implement logic to create a virtual partition of at least a portion of the chiplets based on association with a particular tenant, and a service level agreement associated with the particular tenant, and wherein the method further comprises mapping a portion of the chiplets of the hardware resource to the virtual partition.

In Example 28, the subject matter of Examples 24-27 includes, wherein the modular fabric is further configured to implement logic to: verify attestation of the chiplets, using root of trust logic implemented by the modular fabric, based on attestation provided from the chiplets.

In Example 29, the subject matter of Example 28 includes, wherein the modular fabric is further configured to implement logic to: verify an identity and configuration of the respective chiplets.

In Example 30, the subject matter of Examples 24-29 includes, wherein the modular fabric is further configured to implement logic to: monitor and enforce the configuration of the chiplets in the hardware resource, based on a composed node flavor of the virtual computing platform for a particular workload to be processed by the edge computing device.

In Example 31, the subject matter of Example 30 includes, wherein the composed node flavor is one of a plurality of composed node flavors, wherein respective node flavors of the plurality of composed node flavors correspond to respective types of workloads to be processed by the edge computing device, and wherein the respective node flavors provide variations in type and amount of resources used for processing the respective types of workloads.

Example 32 is at least one non-transitory machine-readable storage medium comprising instructions or stored data which may be configured into instructions, wherein the instructions, when configured and executed by processing circuitry of a computing device, cause the processing circuitry to perform any of the operations of Examples 17 to 31.

Example 33 is an apparatus, operable in an edge computing system, the apparatus comprising: means for composing at least one hardware resource from a configuration of a plurality of chiplets; means for identifying a condition for use of the hardware resource, based on an edge computing workload received at the edge computing device; means for obtaining properties of a configuration for the hardware resource that are available to be implemented with the chiplets, the configuration enabling the hardware resource to satisfy the condition for use of the hardware resource; and means for composing the chiplets into the configuration, according to the properties of the configuration, to enable the use of the hardware resource for the edge computing workload.

In Example 34, the subject matter of Example 33 includes, means for identifying the hardware resource as available in the edge computing device to be used for the edge computing workload according to the configuration.

In Example 35, the subject matter of Example 34 includes, means for verifying the configuration of the chiplets in the hardware resource, wherein the chiplets provide attestation for the use of the hardware resource with the edge computing workload according to the configuration.

In Example 36, the subject matter of Examples 33-35 includes, means for managing: compute resources; pooled acceleration resources; pooled memory resources; or pooled storage resources.

In Example 37, the subject matter of Example 36 includes, means for establishing a composition of the chiplets to produce a virtual edge appliance for handling the edge computing workload on behalf of a tenant, and wherein the virtual edge appliance provides use of: a portion of accelerator components from the pooled acceleration resources, a portion of compute components from the compute resources, a portion of the memory from the pooled memory resources, and a portion of the storage from the pooled storage resources.

In Example 38, the subject matter of Examples 33-37 includes, means for identifying a configuration for the configurable resource; and means for loading the configuration onto the configurable resource.

In Example 39, the subject matter of Examples 35-38 includes, means for coordinating the chiplets for use as a virtual computing platform in a fabric.

In Example 40, the subject matter of Example 39 includes, means for establishing a chiplet I/O interface to the fabric, the chiplet I/O interface configured to enable registration of the properties of the chiplets, manage hardware partitions of the chiplets, and connect the chiplets to the fabric.

In Example 41, the subject matter of Examples 39-40 includes, means for performing discovery and registration of the chiplets; means for identifying available compositions of the chiplets; and means for enabling a user software stack to discover functionality provided for the chiplets.

In Example 42, the subject matter of Examples 35-41 includes, means for implementing logic to create a virtual partition of at least a portion of the chiplets based on association with a particular tenant, and a service level agreement associated with the particular tenant; and means for mapping a portion of the chiplets of the hardware resource to the virtual partition.

In Example 43, the subject matter of Examples 35-42 includes, means for verifying attestation of the chiplets, using root of trust logic, based on attestation provided from the chiplets.

In Example 44, the subject matter of Example 43 includes, means for verifying an identity and configuration of the respective chiplets.

In Example 45, the subject matter of Examples 35-44 includes, means for monitoring and enforcing the configuration of the chiplets in the hardware resource, based on a composed node flavor of a virtual computing platform for a particular workload to be processed by the edge computing device.

In Example 46, the subject matter of Example 45 includes, means for establishing the composed node flavor as one of a plurality of composed node flavors; wherein respective node flavors of the plurality of composed node flavors correspond to respective types of workloads to be processed by the edge computing device, and wherein the respective node flavors provide variations in type and amount of resources used for processing the respective types of workloads.

Example 47 is an edge computing composed node flavor system, configurable among a plurality of flavors, based on dynamically configured connection of chiplets of a processing circuitry, memory and interconnect capabilities, according to the operations of any of Examples 1 to 46.

Example 48 is processing circuitry comprising configurable IP blocks and chiplet arrangements, according to the operations of any of claims 1 to 46.

Example 49 is a modular fabric within a computing platform, configured or used according to the operations of any of Examples 1 to 46.

Example 50 is a modular I/O controller within a computing platform, configured or used according to the operations of any of Examples 1 to 46.

Example 51 is at least one machine-readable storage medium including instructions, wherein the instructions, when executed by a processing circuitry of a computing device, cause the processing circuitry to perform operations of any of Examples 1 to 46.

Example 52 may include one or more computer-readable storage media comprising data to cause an electronic device, upon loading, execution, configuration, or provisioning of the data by one or more processors or electronic circuitry of the electronic device, to perform one or more elements of a method described in or related to any of Examples 1 to 46, or any other method or process described herein.

Example 53 may include an apparatus comprising logic, modules, or circuitry to perform one or more elements of a method described in or related to any of Examples 1 to 46, or any other method or process described herein.

Example 54 may include a method, technique, or process for chiplet management, configuration, and deployment, as described in or related to any of Examples 1 to 46, or portions or parts thereof.

Example 55 may include an apparatus comprising: one or more processors and one or more computer readable media comprising instructions that, when executed by the one or more processors, cause the one or more processors to perform the method, techniques, or process as described in or related to any of Examples 1 to 46, or portions thereof.

Example 56 may include a signal as described in or related to any of Examples 1 to 46, or portions or parts thereof Example 57 may include a signal in a wireless network as described in or related to any of Examples 1 to 46, or as otherwise shown and described herein.

Example 58 may include a method of performing or coordinating communications in a wireless network as described in or related to any of Examples 1 to 46, or as otherwise shown and described herein.

Example 59 may include a device for processing communication as described in or related to any of Examples 1 to 46, or as otherwise shown and described herein.

Example 60 is a network comprising respective devices and device communication mediums for performing any of the operations of Examples 1 to 46, or as otherwise shown and described herein.

Example 61 is an edge cloud computing device implementation comprising processing nodes and computing units adapted for performing any of the operations of Examples 1 to 46, or as otherwise shown and described herein.

Example 62 is an apparatus comprising means to implement of any of Examples 1 to 61.

Example 63 is a system to implement of any of Examples 1-62.

Example 64 is a method to implement of any of Examples 1-62.

In the above Detailed Description, various features may be grouped together to streamline the disclosure. However, claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. An apparatus comprising:
   processing circuitry and memory configured to:
   receive, from each of a plurality of discrete, dynamically-reconfigurable chiplets, an attestation key for cryptographic device identity, attestation, and data encryption;
   use the attestation keys to identify a plurality of chiplet configurations and provide the attestation to a verifier that contains a policy describing at least one of acceptable or unacceptable configurations of the chiplets;
   determine that a virtual hardware resource is to be created in a computing system; and
   compose the chiplets into a configuration in a topology to implement the virtual hardware resource in response to a determination that the configuration of the chiplets is an acceptable configuration for the virtual hardware resource,
   wherein at least some of the chiplets have at least one of different functionalities or physical characteristics and the chiplets comprise hot-pluggable chiplets added by connection of a new discrete device to the computing system, the new discrete device to provide access to the hot-pluggable chiplets.

2. The apparatus of claim 1, wherein the chiplets comprise disaggregated input/output (I/O) components and a dedicated chiplet that includes I/O controller logic to control communications between the disaggregated I/O components.

3. The apparatus of claim 1, wherein the at least one of different functionalities or physical characteristics are tailored to specialized classes of workloads.

4. The apparatus of claim 3, wherein the specialized classes of workloads include content streaming, real-time control, messaging, and social media workloads.

5. The apparatus of claim 1, wherein the processing circuitry is further configured to discover resources provided by the chiplets and identify metadata of the chiplets that indicates functionality of the resources provided by the chiplets.

6. The apparatus of claim 1, wherein the virtual hardware resource provides edge computing service in an edge computing system.

7. The apparatus of claim 1, wherein the processing circuitry is further configured to map workloads and use cases of the computing system to one of a plurality of platform types, each platform type providing different central processing unit (CPU) and storage resources, the platform types comprising respective configurations to process: a flexible network function virtualization (NFV) workload, a video processing or video analytics workload, an augmented reality (AR) or virtual reality (VR) and gaming workload, a data-caching and storage gateway workload, an internet-of-things (IoT) processing workload, an autonomous vehicle workload, a function-as-a-service (FAAS) workload, and a speech recognition workload.

8. The apparatus of claim 1, wherein the processing circuitry is further configured to implement workload assessment as a service to update an initial workload mapping of a workload during a lifecycle of the workload to provide assessment and reallocation of the workload based on over time characterization of the workload.

9. The apparatus of claim 1, wherein the processing circuitry is further configured to combine sets of chiplets, each of the set of chiplets to provide different discrete resources into a composite node to service a workload, and each of the sets of chiplets located in different areas of a server rack connected via an interconnect.

10. The apparatus of claim 1, wherein the processing circuitry is further configured to provide a main orchestration element to manage data and control plane communications of complex service chains of a plurality of services of an application to provide a workload.

11. The apparatus of claim 1, wherein the processing circuitry is further configured to deploy the chiplets for edge compute processing to enable variable encryption, decryption, encoding, and decoding capabilities for modular input/output (I/O) interfaces and provide buffering for ultra-low power operation of the modular I/O interfaces.

12. The apparatus of claim 1, wherein the processing circuitry is further configured to validate the chiplets using Root-of-Trust (RoT) logic and the attestation using verification of signatures of the chiplets.

13. The apparatus of claim 1, wherein the processing circuitry is further configured to control a modular input/output (I/O) fabric that connects pooled acceleration, compute, storage, and memory resources to establish a virtual edge appliance that provides a virtual central processing unit (CPU) configuration for workloads, functions, applications, and services for the computing system, the virtual CPU configuration having a set of acceleration, compute, storage, and memory resources of the pooled acceleration, compute, storage, and memory resources in a particular processing configuration, each pool of the acceleration, compute, storage, and memory resources connected to the modular I/O fabric through a chiplet I/O interface.

14. The apparatus of claim 1, wherein the processing circuitry is further configured to:
identify available configurable resources and physical and logical properties of each of the resources, and
register the chiplet configurations provided by at least one chiplet at each of the resources using a registration interface associated with the resource.

15. The apparatus of claim 14, wherein the processing circuitry is further configured to track characteristics of the at least one chiplet during runtime using the registration through notification provided through the registration interface.

16. The apparatus of claim 14, wherein the processing circuitry is further configured to manage hardware partitions of the at least one chiplet and chiplet input/output (I/O) components, each partition associated to an application with a particular process address identifier (PASID).

17. The apparatus of claim 1, wherein the processing circuitry is further configured to perform security verification of the chiplets by polling an internal bus to determine, for each chiplet, if an expected number, type, and configuration of the chiplet exists.

18. The apparatus of claim 17, wherein the processing circuitry is further configured to, in response to a determination that, during security verification of the chiplet, at least one of the expected number, type, or configuration does not exist, re-configure, reset, clear, or re-install firmware on the chiplet to return to a known or acceptable state.

19. The apparatus of claim 1, wherein the processing circuitry is further configured to compose the chiplets into a specialized platform or central processing unit (CPU), the chiplets having at least one of different functions or characteristics of a same function within the specialized platform or CPU.

20. The apparatus of claim 1, wherein the processing circuitry is further configured to create a virtual partition of at least a portion of the chiplets based on association with a particular tenant, a service level agreement (SLA) associated with the particular tenant, a hardware configuration associated with the particular tenant, and a list SLAs per each of the chiplets attached to the virtual partition.

21. The apparatus of claim 20, wherein the processing circuitry is further configured to compose the chiplets to provide connectivity associated with the virtual partition based on discovery and registration of the chiplets.

22. The apparatus of claim 1, wherein a same set of parameters are used within each of the attestation keys.

23. The apparatus of claim 1, wherein the processing circuitry is further configured to provide tenant-specific resource partitioning and isolation as variable encryption, decryption, and authentication supported using the attestation keys.

24. The apparatus of claim 1, wherein the processing circuitry is further configured to use a Device Identity Composition Engine (DICE) Root-of-Trust (RoT) key that produces the attestation key, to identify possible chiplet configurations and attest the chiplet configurations to the verifier.

25. The apparatus of claim 24, wherein:
each chiplet is associated with a platform,
each platform has a respective resident DICE RoT, and
attestation and RoT logic is implemented by a specialized RoT that accepts attestations and tests authenticity of the respective resident DICE RoTs.

26. A method of implementing a virtual hardware resource in a computing system, the method comprising:
receiving, from each of a plurality of discrete, dynamically-reconfigurable chiplets, an attestation key for cryptographic device identity, attestation, and data encryption;
using the attestation key to identify a plurality of chiplet configurations and provide the attestation to a verifier that contains a policy describing at least one of acceptable or unacceptable configurations of the chiplets;
verifying, for each chiplet, the cryptographic device identity and attestation of the chiplet using the attestation key;
determining that the virtual hardware resource is to be created;
determining whether a configuration of the chiplets is an acceptable configuration for the virtual hardware resource; and
composing the chiplets into a configuration to implement the virtual hardware resource in response to a determination that the configuration of the chiplets is an acceptable configuration for the virtual hardware resource,
wherein at least some of the chiplets have at least one of different functionalities or physical characteristics and the chiplets comprise hot-pluggable chiplets added by connection of a new discrete device to the computing system, the new discrete device to provide access to the hot-pluggable chiplets.

27. The method of claim 26, further comprising performing security verification for each chiplet by polling an internal bus to determine if an expected number, type, and configuration of the chiplet exists.

28. The method of claim 27, further comprising, in response to a determination that, during security verification of the chiplet, at least one of the expected number, type, or configuration does not exist, re-configure, reset, clear, or re-install firmware on the chiplet to return to a known or acceptable state.

29. At least one non-transitory machine-readable medium comprising instructions, wherein the instructions, when implemented by a processing circuitry of a computing device, cause the processing circuitry to perform operations to:
receive, from each of a plurality of discrete, dynamically-reconfigurable chiplets, an attestation key for cryptographic device identity, attestation, and data encryption;
use the attestation key to identify a plurality of chiplet configurations and provide the attestation to a verifier that contains a policy describing at least one of acceptable or unacceptable configurations of the chiplets;
verify, for each chiplet, the cryptographic device identity and attestation of the chiplet using the attestation key;

determine that a virtual hardware resource is to be created;

determine whether a configuration of the chiplets is an acceptable configuration for the virtual hardware resource; and compose the chiplets into a configuration to implement the virtual hardware resource in response to a determination that the configuration of the chiplets is an acceptable configuration for the virtual hardware resource, wherein at least some of the chiplets have at least one of different functionalities or physical characteristics and the chiplets comprise hot-pluggable chiplets added by connection of a new discrete device to the computing device, the new discrete device to provide access to the hot-pluggable chiplets.

30. The at least one non-transitory machine-readable medium of claim 29, wherein the instructions, when implemented by the processing circuitry, cause the processing circuitry to perform further operations to perform security verification for each chiplet by polling an internal bus to determine if an expected number, type, and configuration of the chiplet exists.

31. The at least one non-transitory machine-readable medium of claim 29, wherein the instructions, when implemented by the processing circuitry, cause the processing circuitry to perform further operations to, in response to a determination that, during security verification of the chiplet, at least one of an expected number, type, or configuration does not exist, re-configure, reset, clear, or re-install firmware on the chiplet to return to a known or acceptable state.

* * * * *